United States Patent
Yang et al.

(10) Patent No.: US 9,397,814 B2
(45) Date of Patent: Jul. 19, 2016

(54) METHOD FOR TRANSRECEIVING SIGNAL AND APPARATUS FOR SAME

(71) Applicant: LG Electronics Inc., Seoul (KR)

(72) Inventors: Suckchel Yang, Anyang-si (KR); Dongyoun Seo, Anyang-si (KR); Bonghoe Kim, Anyang-si (KR); Joonkui Ahn, Anyang-si (KR)

(73) Assignee: LG Electronics Inc., Seoul (KR)

(*) Notice: Subject to any disclaimer, the term of this patent is extended or adjusted under 35 U.S.C. 154(b) by 34 days.

(21) Appl. No.: 14/376,332

(22) PCT Filed: Feb. 12, 2013

(86) PCT No.: PCT/KR2013/001070
§ 371 (c)(1),
(2) Date: Aug. 1, 2014

(87) PCT Pub. No.: WO2013/119090
PCT Pub. Date: Aug. 15, 2013

(65) Prior Publication Data
US 2015/0009872 A1  Jan. 8, 2015

Related U.S. Application Data

(60) Provisional application No. 61/731,490, filed on Nov. 30, 2012, provisional application No. 61/753,937, (Continued)

(51) Int. Cl.
*H04L 5/00* (2006.01)
*H04J 3/00* (2006.01)
(Continued)

(52) U.S. Cl.
CPC .............. *H04L 5/0055* (2013.01); *H04J 3/00* (2013.01); *H04L 1/1819* (2013.01);
(Continued)

(58) Field of Classification Search
CPC ....... H04W 48/02; H04W 12/12; H04W 8/20; H04W 8/24; H04L 63/162; H04L 63/08; H04L 5/0055; H04L 1/1861; H04L 1/1822; H04L 1/1835; H04L 1/1819; H04L 1/1854; H04L 5/14; H04L 1/1864; H04L 5/1469; H04L 1/1896; H04J 3/00

USPC ......... 370/229, 230, 231, 235, 276, 277, 278, 370/280, 282, 310, 328, 338, 351, 428; 455/403, 422.1
See application file for complete search history.

(56) References Cited

U.S. PATENT DOCUMENTS

2013/0034028 A1* 2/2013 Chen et al. ............... 370/280
2013/0051289 A1* 2/2013 Hsieh et al. .............. 370/280
2013/0114472 A1* 5/2013 Tamaki et al. ........... 370/280

FOREIGN PATENT DOCUMENTS

KR 1020080003682   1/2008
KR 1020080109678   12/2008
(Continued)

OTHER PUBLICATIONS

LG Electronics: "Issues on DL HARQ process in case of CA with different TDD UL-DL configurations", 3GPP TSG RAN WG1 #71, R1-124970, Nov. 12-16, 2012.
(Continued)

*Primary Examiner* — Obaidul Huq
(74) *Attorney, Agent, or Firm* — Dentons US LLP

(57) ABSTRACT

Hybrid automatic repeat request (HARQ) for carrier aggregation, that involves setting a first cell having a first time division duplex (TDD) uplink-downlink (UL-DL) configuration and a second cell having a second TDD UL-DL configuration; receiving data through a DL subframe of the first cell; and saving at least a portion of the data to a HARQ soft buffer when decoding is unsuccessful. The size of the HARQ soft buffer is determined based on the number of HARQ processes of the first cell, which, in turn, is determined based on the number of subframes of which the first cell is the DL within a specific HARQ round trip time, wherein at least one subframe of which the first cell is the DL and the second cell is the UL is excluded when determining the number of the HARQ processes.

4 Claims, 15 Drawing Sheets

Related U.S. Application Data filed on Jan. 18, 2013, provisional application No. 61/597,115, filed on Feb. 9, 2012, provisional application No. 61/606,457, filed on Mar. 4, 2012, provisional application No. 61/617,663, filed on Mar. 30, 2012, provisional application No. 61/648,615, filed on May 18, 2012, provisional application No. 61/655,470, filed on Jun. 4, 2012, provisional application No. 61/696,218, filed on Sep. 2, 2012, provisional application No. 61/705,135, filed on Sep. 24, 2012, provisional application No. 61/709,978, filed on Oct. 4, 2012, provisional application No. 61/718,714, filed on Oct. 26, 2012.

(51) Int. Cl.
*H04L 1/18* (2006.01)
*H04L 5/14* (2006.01)

(52) U.S. Cl.
CPC ........... *H04L 1/1822* (2013.01); *H04L 1/1835* (2013.01); *H04L 1/1854* (2013.01); *H04L 1/1861* (2013.01); *H04L 1/1864* (2013.01); *H04L 1/1896* (2013.01); *H04L 5/14* (2013.01); *H04L 5/1469* (2013.01)

(56) References Cited

FOREIGN PATENT DOCUMENTS

| KR | 1020090008150 | 1/2009 |
|---|---|---|
| KR | 1020090059073 | 6/2009 |
| KR | 1020110111269 | 10/2011 |
| WO | 2011078581 A2 | 6/2011 |
| WO | 2013042936 A1 | 3/2013 |

OTHER PUBLICATIONS

LG Electronics: "Summary of discussion on number of DL HARQ processes", 3GPP TSG RAN WG1 Meeting #77, R1-142128, May 19-23, 2014.

\* cited by examiner

PDSCH-ACK/NACK timing (UL-DL configuration #1)

PUSCH-PHICH/UL grant timing (UL-DL configuration #1)

HARQ processes in UL-DL configuration #1

FIG. 13
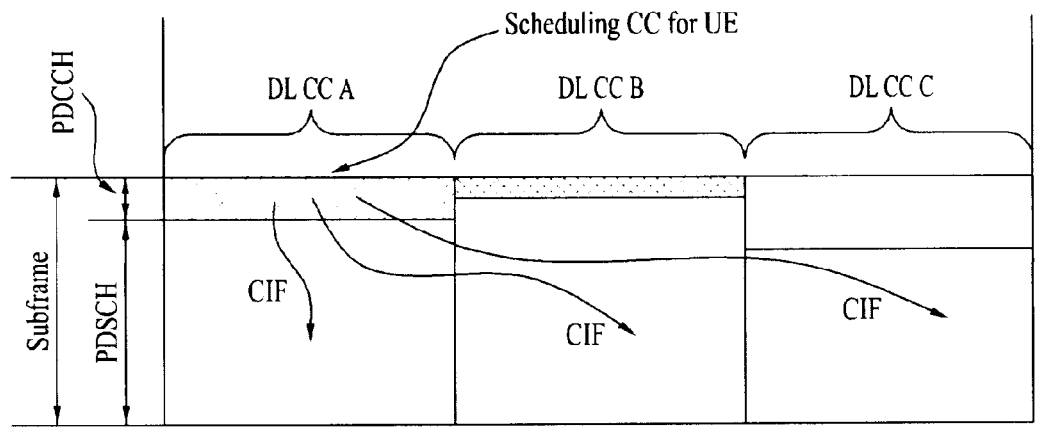
FIG. 14
| SF index | 0 | 1 | 2 | 3 | 4 | 5 | 6 | 7 | 8 | 9 |
|---|---|---|---|---|---|---|---|---|---|---|
| PCC (Cfg 3) | D | S | U | U | U | D | D | D | D | D |
| DL association set index | | | (7,6,11) | (6,5) | (5,4) | | | | | |
| SF index | 0 | 1 | 2 | 3 | 4 | 5 | 6 | 7 | 8 | 9 |
|---|---|---|---|---|---|---|---|---|---|---|
| SCC (Cfg 3) | D | S | U | U | U | D | D | D | D | D |
| DL association set index | | | (7,6,11) | (6,5) | (5,4) | | | | | |
FIG. 15
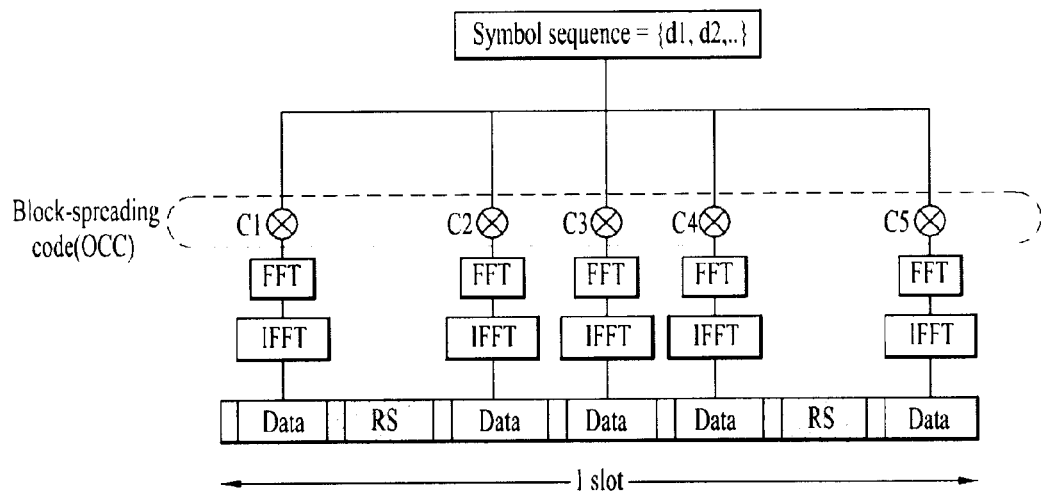

*Downlink signal is received on PCC:
 ACK/NACK timing configured for PCC is applied (i.e. Ref-Cfg = PCC Cfg)

*Downlink signal is received on SCC:
 Ref-Cfg is determined according to F1~F3 and H1~H3

METHOD FOR TRANSRECEIVING SIGNAL AND APPARATUS FOR SAME

This application is a 35 USC §371 National Stage entry of International Application No. PCT/KR2013/001070 filed on Feb. 12, 2013, and claims priority to US Provisional Application Nos. 61/731,490 filed on Nov. 30, 2012; 61/753,937 filed on Jan. 18, 2013; 61/597,115 filed on Feb. 9, 2012; 61/606,457 filed on Mar. 4, 2012; 61/617,663 filed on Mar. 30, 2012; 61/648,615 filed on May 18, 2012; 61/655,470 filed on Jun. 4, 2012; 61/696,218 filed on Sep. 2, 2012; 61/705,135 filed on Sep. 24, 2012; 61/709,978 filed Oct. 4, 2012 and 61/718,714 filed on Oct. 26, 2012, all of which are hereby incorporated by reference in their entireties as if fully set forth herein.

TECHNICAL FIELD

The present invention relates to a wireless communication system and, more particularly, to a method for transmitting and receiving a signal in a multi-carrier system supporting time division duplex (TDD) and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting and receiving a signal in a wireless communication system and an apparatus therefor. Another object of the present invention is to provide a method for transmitting and receiving a signal in a multi-carrier system supporting TDD and an apparatus therefor. Another object of the present invention is to provide a method for reusing previous signal transmission/reception timing when signal transmission/reception timing is set in a multi-carrier system supporting TDD and an apparatus therefor. Another object of the present invention is to provide a method for efficiently operating a HARQ process in a multi-carrier system supporting TDD and an apparatus therefor.

The technical problems solved by the present invention are not limited to the above technical problems and those skilled in the art may understand other technical problems from the following description.

Technical Solution

The object of the present invention can be achieved by providing a method for carrying out hybrid automatic repeat request (HARQ) in a wireless communication system supporting carrier aggregation, the method including: setting a first cell having a first time division duplex (TDD) uplink-downlink (UL-DL) configuration and a second cell having a second TDD UL-DL configuration; receiving data through a DL subframe of the first cell; and storing at least a portion of the data in a HARQ soft buffer when decoding of the data fails, wherein the size of the HARQ soft buffer is determined on the basis of the number of HARQ processes of the first cell, and the number of HARQ processes of the first cell is determined on the basis of the number of subframes in which the first cell is DL within a specific HARQ round trip time (RTT), wherein at least one subframe in which the first cell is DL and the second cell is UL is excluded when the number of HARQ processes of the first cell is determined.

Subframe configurations according to TDD UL-DL configurations may be defined as follows.

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Here, D may denote a downlink subframe, S may denote a special subframe and U may denote an uplink subframe.

The specific HARQ RTT may be a HARQ RTT of a TDD UL-DL configuration having a smallest number of DL subframes from among one or more TDD UL-DL configurations in which subframes set to DL in the first cell or second cell are set to DL.

The first cell may be a secondary cell and the second cell may be a primary cell.

The first TDD UL-DL configuration may differ from the second TDD UL-DL configuration.

In another aspect of the present invention, provided herein is a communication apparatus configured to carry out HARQ in a wireless communication system supporting carrier aggregation, including: a radio frequency (RF) unit; and a processor, wherein the processor is configured to set a first cell having a first TDD UL-DL configuration and a second cell having a second TDD UL-DL configuration, to receive data through a DL subframe of the first cell and to store at least a portion of the data in a HARQ soft buffer when decoding of the data fails, wherein the size of the HARQ soft buffer is determined on the basis of the number of HARQ processes of the first cell, and the number of HARQ processes of the first cell is determined on the basis of the number of subframes in which the first cell is DL within a specific HARQ RTT, wherein at least one subframe in which the first cell is DL and the second cell is UL is excluded when the number of HARQ processes of the first cell is determined.

Advantageous Effects

According to the present invention, it is possible to efficiently transmit and receive a signal in a wireless communication system. In addition, it is possible to transmit and receive a signal in a multi-carrier system supporting TDD. Furthermore, it is possible to reuse previous signal transmission/reception timing when signal transmission/reception timing is set in a multi-carrier system supporting TDD. More-over, it is possible to efficiently operate a HARQ process in a multi-carrier system supporting TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 13 illustrates scheduling when plural carriers are aggregated;

FIG. 14 illustrates a method for transmitting ACK/NACK information using channel selection in a conventional CA TDD system;

FIG. 15 illustrates a slot level PUCCH format 3 structure;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
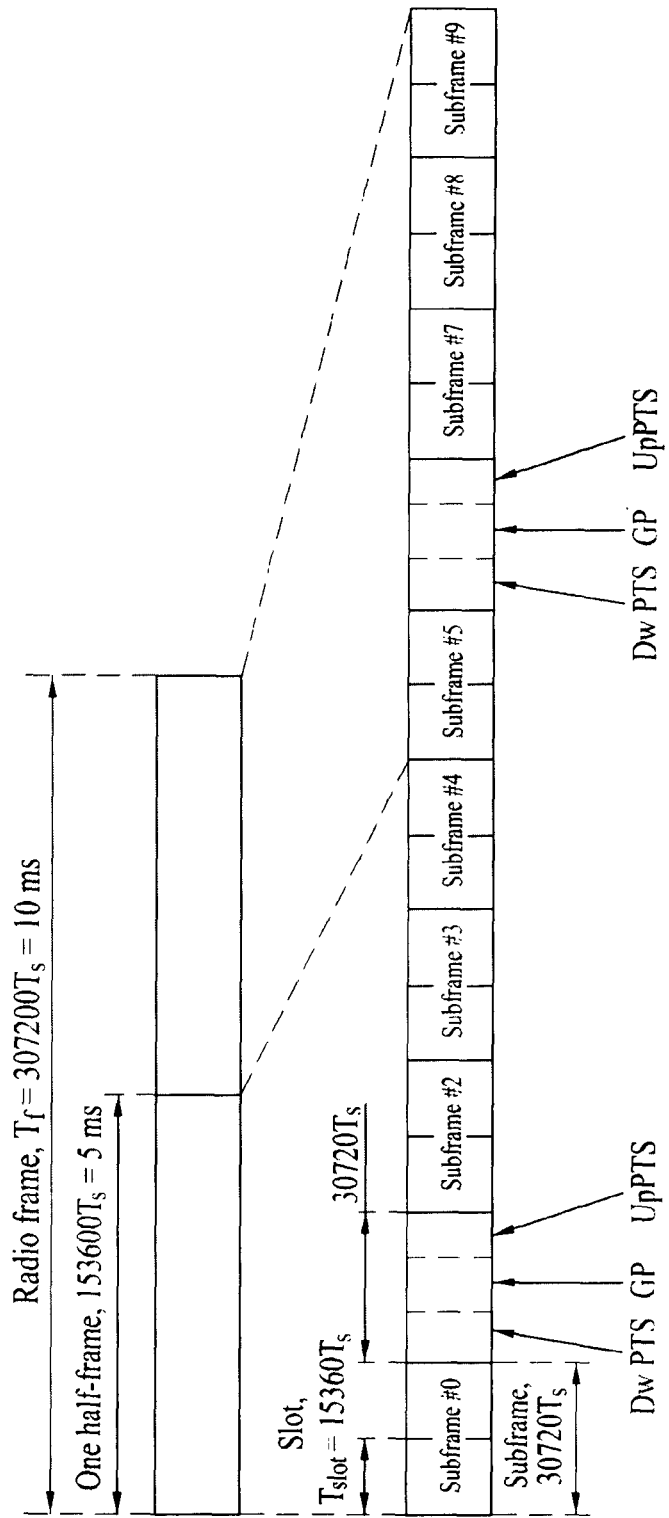
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes of equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band. Since downlink transmission and uplink transmission are discriminated from each other by time in the TDD (Time Division Duplex) mode, a radio frame includes both a downlink subframe and an uplink subframe in a specific frequency band.

Particularly, FIG. 1 shows a radio frame structure for TDD, used in 3GPP LTE(-A). Table 1 shows uplink-downlink (UL-DL) configurations (UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
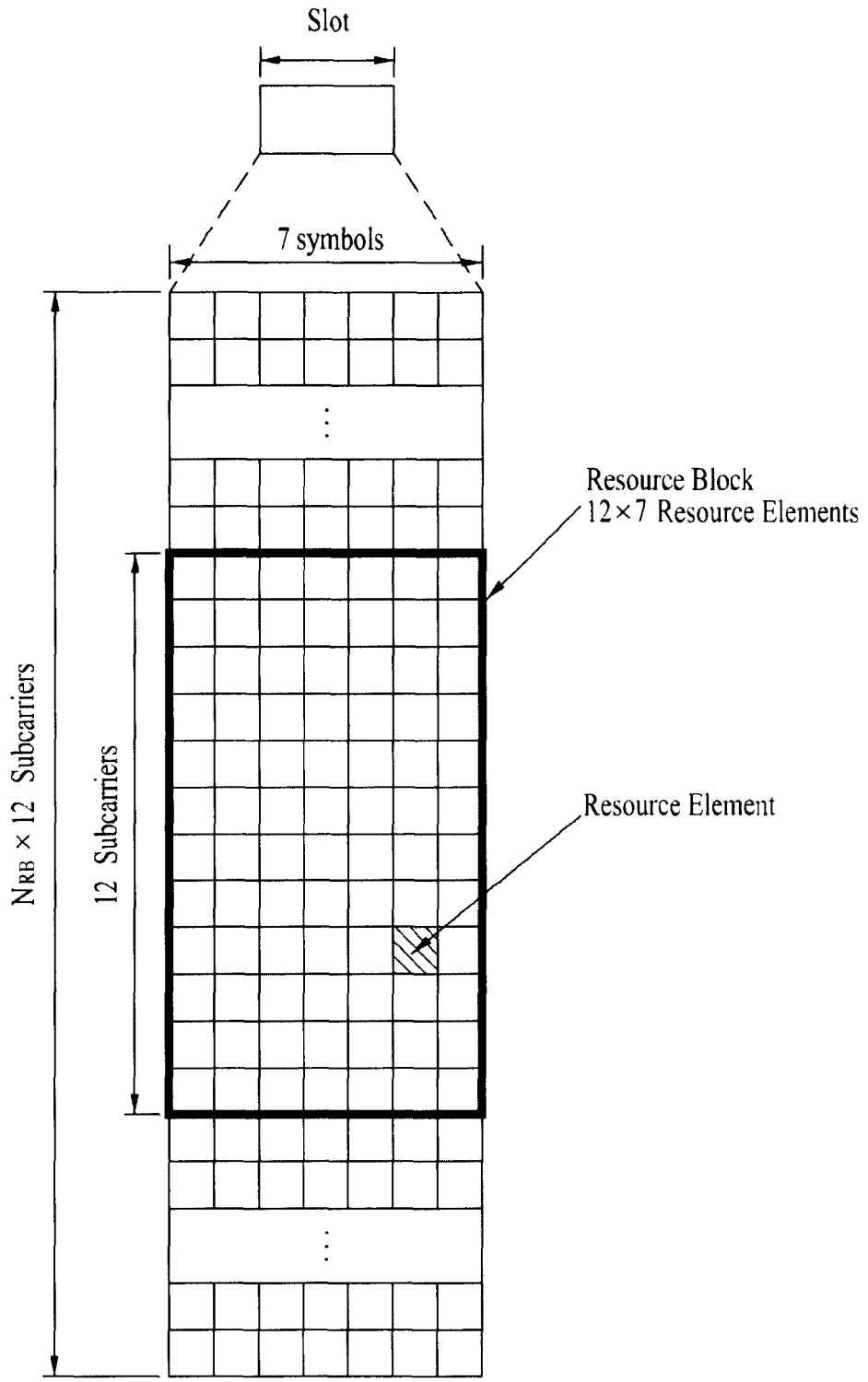
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
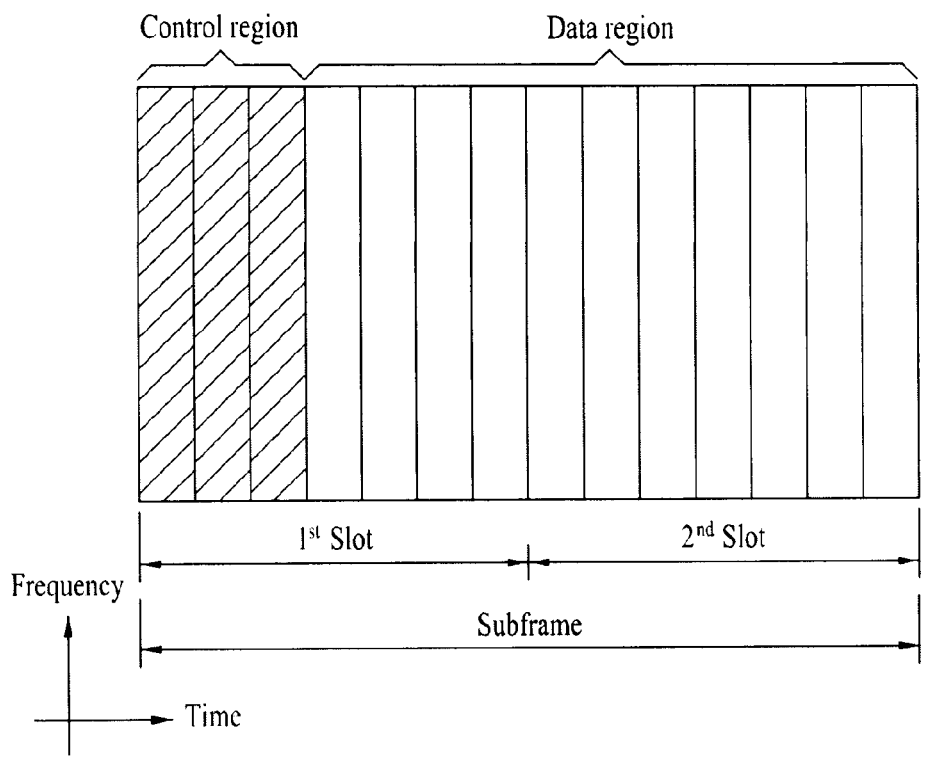
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode (TM)

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO (Multiple Input Multiple Output)

Transmission mode 6: Closed-loop rank-1 precoding

Transmission mode 7: Transmission using UE-specific reference signals

DCI Format

Format 0: Resource grants for the PUSCH (Physical Uplink Shared Channel) transmissions (uplink)

Format 1: Resource assignments for single codeword PDSCH (Physical Downlink Shared Channel) transmissions (transmission modes 1, 2 and 7)

Format 1A: Compact signaling of resource assignments for single codeword PDSCH (all modes)

Format 1B: Compact resource assignments for PDSCH using rank-1 closed loop precoding (mode 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
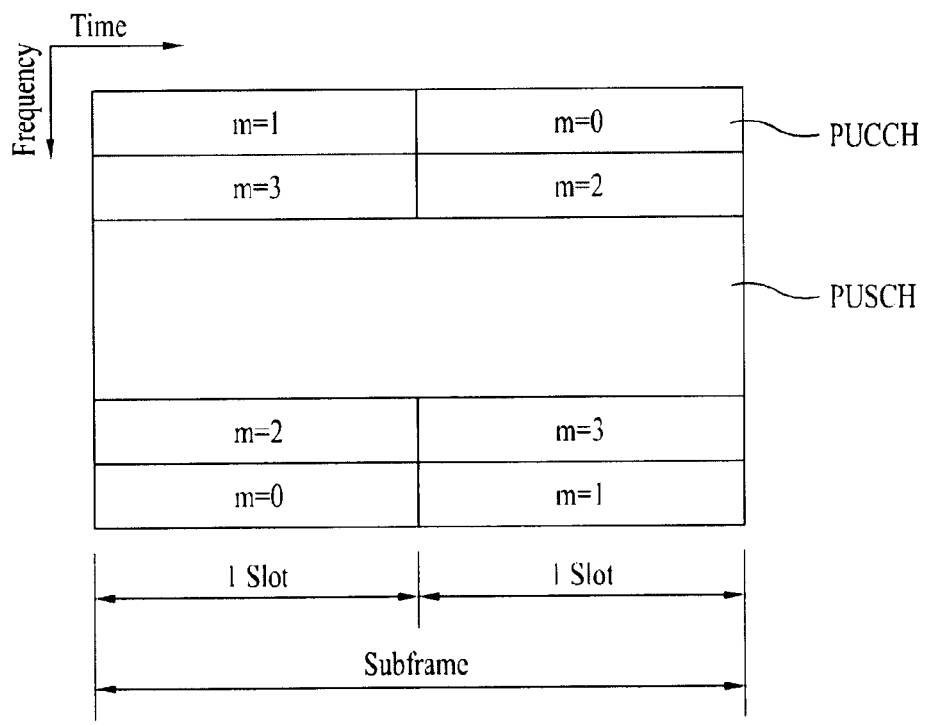
FIG. 4 illustrates an uplink subframe structure.

FIG. 4 illustrates an uplink subframe structure for use in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords. A HARQ-ACK response includes positive ACK (simply, ACK), negative ACK (NACK), DTX (Discontinuous Transmission) or NACK/DTX. Here, the term HARQ-ACK is used interchangeably with the term HARQ ACK/NACK and ACK/NACK.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
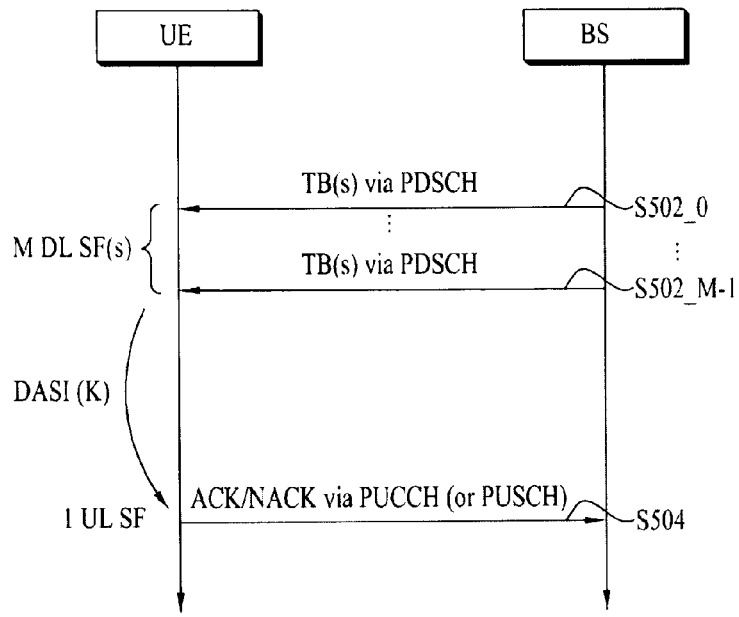
FIGS. 5 and 6 illustrate TDD UL ACK/NACK (Uplink Acknowledgement/Negative Acknowledgement) transmission timing in a single cell situation.
Figure 6:
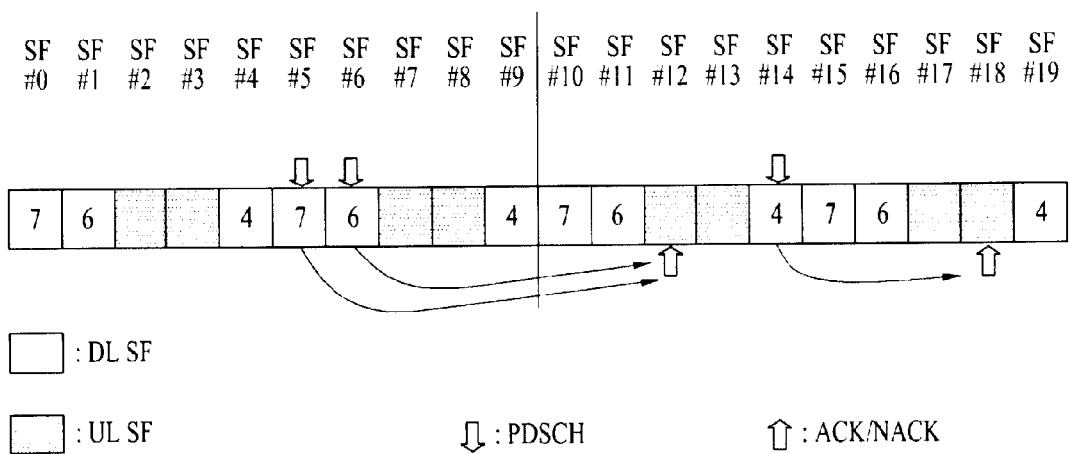

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M−1. While ACK/NACK is transmitted through a PUCCH basically, ACK/NACK is transmitted through a PUSCH when the PUSCH is transmitted at an ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: $\{k_0, k_1, \ldots, k_{M-1}\}$) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for at least one DL transmission signal (e.g. PDSCH) received through M DL SFs through a single UL SF. ACK/NACK for a plurality of DL SFs is transmitted through a single UL SF as follows.

1) ACK/NACK bundling: ACK/NACK bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for ACK/NACK transmission. ACK/NACK responses to the plurality of data units are identified by combinations of PUCCH resources used for ACK/NACK transmission and transmitted ACK/NACK (e.g. bit values and QPSK symbol values). Channel selection is also referred to as ACK/NACK selection and PUCCH selection.

FIG. 6 illustrates UL ACK/NACK transmission timing when UL-DL configuration #1 is set. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
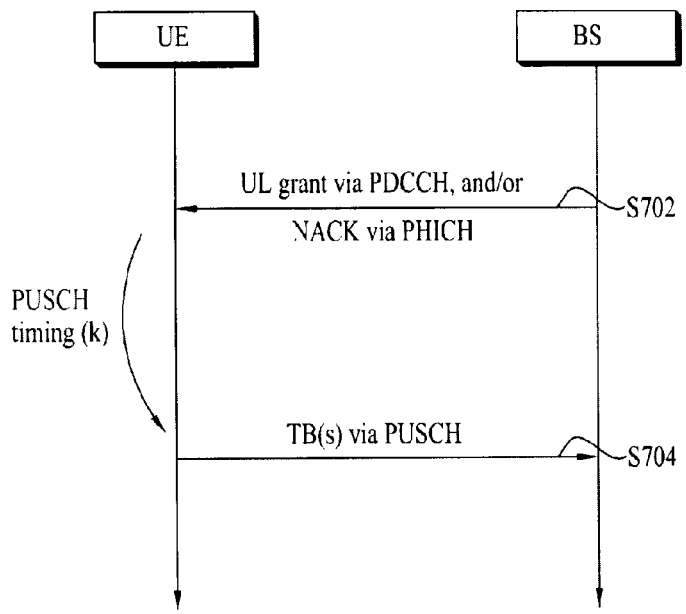
FIGS. 7 and 8 illustrate TDD PUSCH (Physical Uplink Shared Channel) transmission timing in a single cell situation.
Figure 8:
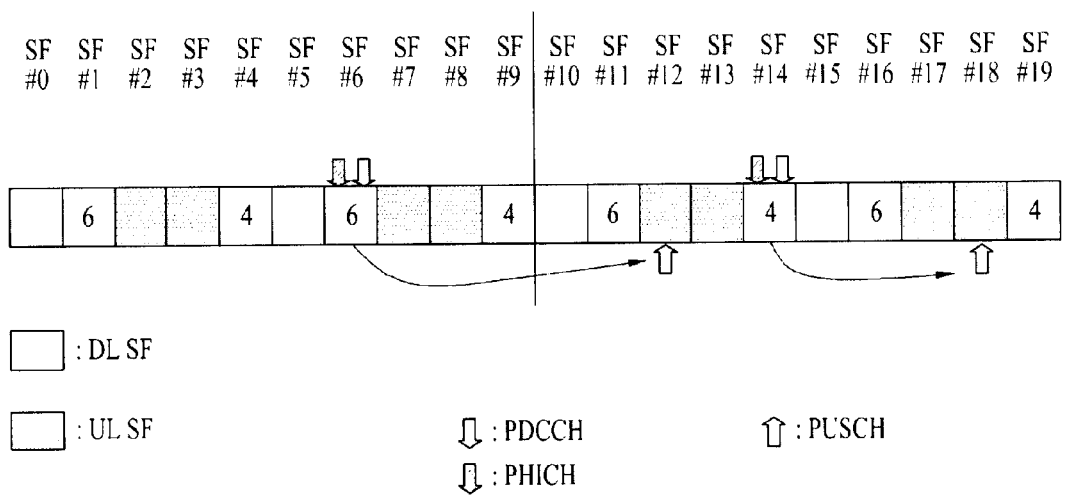

FIGS. 7 and 8 illustrate PHICH/UL grant (UG)-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | | 4 | | | | | 4 |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
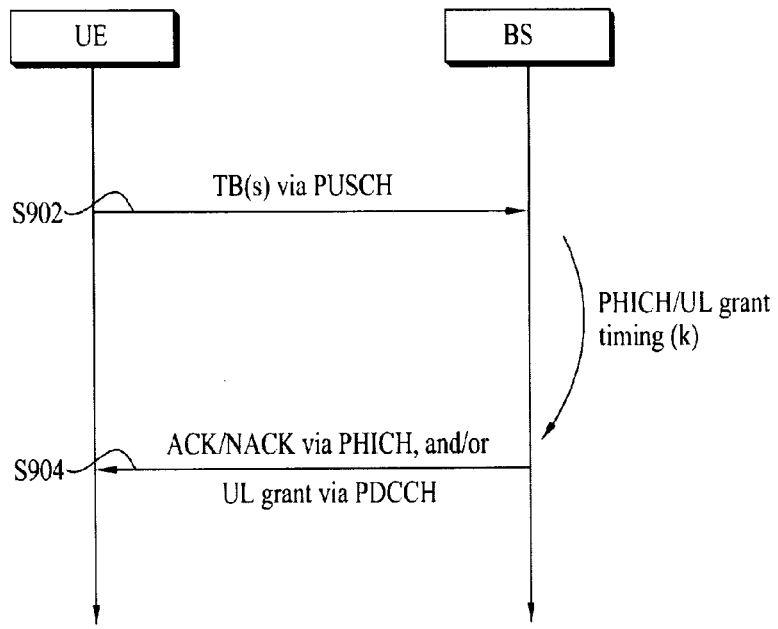
FIGS. 9 and 10 illustrate TDD DL ACK/ANCK transmission timing in a single cell situation.
Figure 10:
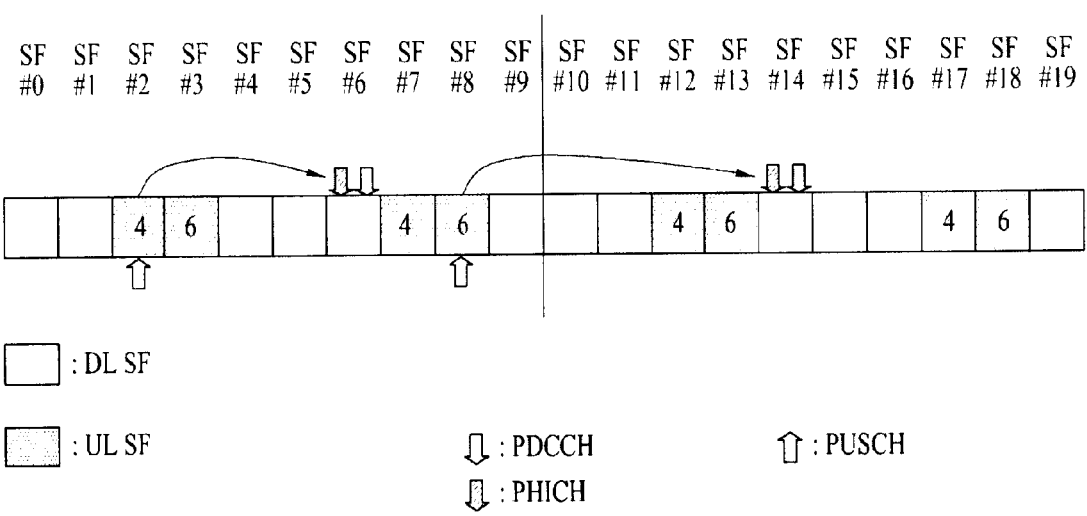

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframes (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i−k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

FIG. 10 illustrates PHICH/UL grant transmission timing when UL-DL configuration #1 is set. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

A description will be given of PHICH resource assignment. When a PUSCH is transmitted in subframe #n, the UE determines a corresponding PHICH resource in subframe #(n+kPHICH). In FDD, kPHICH has a fixed value (e.g. 4). In TDD, kPHICH has a value depending on UL-DL configuration. Table 7 shows kPHICH values for TDD and is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are set differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the maximum number of DL HARQ processes according to UL-DL configuration in TDD.

TABLE 8

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

A HARQ process is associated with a soft buffer for transport blocks and a soft buffer for code blocks in PHY (Physical) layer. During channel coding, a transport block can be divided into one or more code blocks in consideration of a channel encoder size. After channel coding, the one or more code blocks are combined to form a codeword corresponding to the transport block.

The HARQ process is used for reliable transport block transmission. A transport block can be divided into one or more code blocks in consideration of an encoder size. In LTE(-A), a code block is coded according to 1/3 TURBO coding and the coded code block includes a system sub-block and two parity sub-block. Each sub-block is permuted through a sub-block interleaver matrix having a size of $K_\pi$. A circular buffer of length $K_w=3K_\pi$ for the r-th coded block is generated as follows.

$$w_k = v_k^{(0)} \text{ for } k=0,\ldots,K_\pi-1 \quad [\text{Equation 1}]$$

$$w_{K_\pi+2k} = v_k^{(1)} \text{ for } k=0,\ldots,K_\pi-1$$

$$w_{K_\pi+2k+1} = v_k^{(2)} \text{ for } k=0,\ldots,K_\pi-1$$

$N_{IR}$ bits denote the soft buffer size for the transport block and $N_{cb}$ denotes the soft buffer size for the r-th code block. $N_{cb}$ is obtained as follows, where C is the number of code blocks.

$$N_{cb} = \min\left(\left\lfloor \frac{N_{IR}}{C} \right\rfloor, K_w\right) \text{ for DL-} \quad [\text{Equation 2}]$$

SCH and PCH transport channels $N_{cb} = K_w$ for UL-SCH and MCH transport channels $N_{IR}$ is represented as follows.

$$N_{IR} = \left\lfloor \frac{N_{soft}}{K_C \cdot K_{MIMO} \cdot \min(M_{DL\_HARQ}, M_{limit})} \right\rfloor \quad [\text{Equation 3}]$$

Here, $N_{soft}$ is the total number of soft channel bits according to UE capability.

If $N_{soft}=35982720$, $K_C=5$,
else if $N_{soft}=3654144$ and the UE is capable of supporting no more than a maximum of two spatial layers for the DL cell, $K_C=2$
    else $K_C=1$
End if.

$K_{MIMO}$ is equal to 2 if the UE is configured to receive PDSCH transmissions based on transmission mode 3, 4, 8 or 9, and is equal to 1 otherwise.

$M_{DL\_HARQ}$ is the maximum number of DL HARQ processes.

$M_{limit}$ is a constant equal to 8.

In FDD and TDD, if the UE is configured with more than two serving cells, then for each serving cell, for at least $K_{MIMO} \cdot \min(M_{DL\_HARQ}, M_{limit})$ transport blocks, the UE stores received soft channel bits corresponding to the range of at least $w_k, w_{k+1}, \ldots, w_{mod(k+n_{SB}-1, N_{cb})}$ upon decoding failure of a code block of a transport block. Here, $n_{SB}$ is given by Equation 4.

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right), \quad [\text{Equation 4}]$$

$w_k$, C, $N_{cb}$, $K_{MIMO}$, and $M_{limit}$ are as defined above.

$M_{DL\_HARQ}$ is the maximum number of DL HARQ processes.

$N_{cells}^{DL}$ is the number of configured serving cells.

$N_{soft}'$ is the total number of soft channel bits according to the UE capability.

In determining k, the UE gives priority to storing soft channel bits corresponding to lower values of k. $w_k$ corresponds to a received soft channel bit. The range $W_k, w_{k+1}, \ldots, w_{mod(k+n_{SB}-1, N_{cb})}$ may include subsets which do not containing received soft channel bits.

Figure 11:
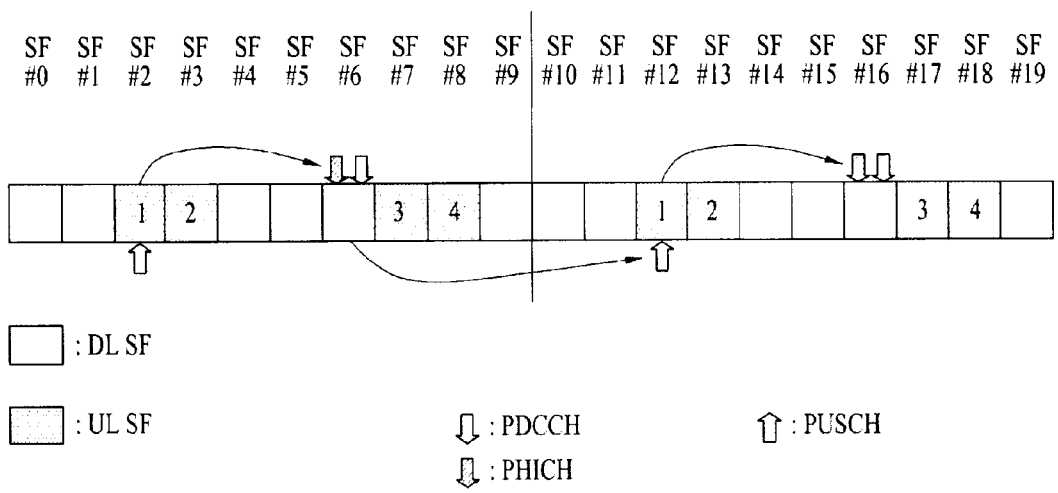
FIG. 11 illustrates a TDD HARQ (Hybrid Automatic Repeat request) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
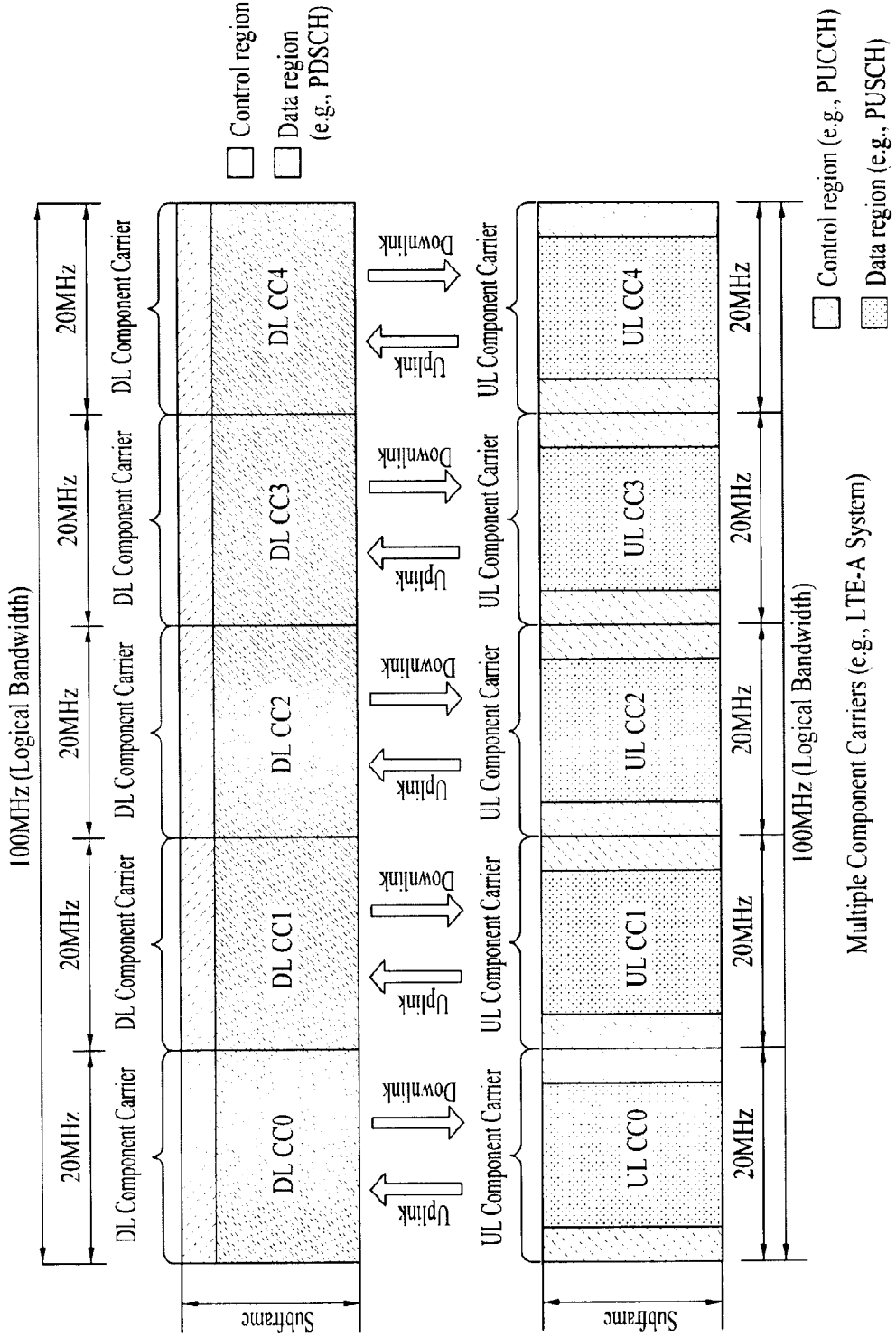
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC. The scheduling CC/scheduled CC may also be called MCC/SCC in the following description.

When cross-CC scheduling is set, CCs carrying signals are defined according to signal type as follows.
PDCCH (UL/DL grant): scheduling CC (or MCC)
PDSCH/PUSCH: CC indicated by a CIF of a PDCCH, detected from a scheduling CC
DL ACK/NACK (e.g. PHICH): scheduling CC (or MCC) (e.g. DL PCC)
UL ACK/NACK (e.g. PUCCH): UL PCC FIG. 14 illustrates a method for transmitting ACK/NACK information using channel selection in a conventional CA TDD system.

Referring to FIG. 14, it is assumed that 2 serving cells (i.e. PCell and SCell or PCC and SCC) having the same TDD UL-DL Cfg are aggregated in the conventional CA TDD system. A channel selection scheme using PUCCH format 1b when M≤2 in a UL subframe n for HARQ-ACK transmission will first be described. Here, M denotes the number of (i.e. the number of DL SFs corresponding to UL SFs) of elements of set K described above with reference to Table 4. When M≤2 in the UL subframe n, a UE can transmit b(0)b(1) on a PUCCH resource selected from A PUCCH resources $n^{(1)}_{PUCCH,i}$ (0≤i≤A−1 and A ∈ {2,3,4}). Specifically, the UE transmits an A/N signal in the UL subframe n using PUCCH format 1b according to Table 10, 11 and 12. When M=1 in the UL subframe n, HARQ-ACK(j) denotes an A/N response to a TB or an SPS release PDCCH, which is related to a serving cell c. Here, when M=1, a TB, HARQ-ACK(j) and A PUCCH resources can be given according to Table 10. When M=2 in the UL subframe n, HARQ-ACK(j) denotes an A/N response to a TB or an SPS release PDCCH in DL subframe(s) provided by set K in each serving cell. Here, M=2, subframes and A PUCCH resources in each serving cell for HARQ-ACK(j) can be given according to Table 14.

Table 10 is a mapping table for channel selection, defined in LTE-A when 2 CCs having the same UL-DL configuration are aggregated, M=1 and A=2.

TABLE 10

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

Here, $n^{(1)}_{PUCCH,0}$ can be allocated an implicit PUCCH resource linked to a PDCCH (i.e. PCC-PDCCH) that schedules a PCC (or PCell) and $n^{(1)}_{PUCCH,1}$ can be allocated an implicit PUCCH resource linked to a PDCCH (i.e. SCC-PDCCH) that schedules an SCC or an explicit PUCCH resource reserved through RRC according to whether or not cross-CC scheduling is applied. For example, $n^{(1)}_{PUCCH,0}$ can be allocated an implicit PUCCH resource linked to the PCC-PDCCH and $n^{(1)}_{PUCCH,1}$ can be allocated an implicit PUCCH resource linked to the SCC-PDCCH when cross-CC scheduling is employed.

Table 11 is a mapping table for channel selection, defined in LTE-A when two CCs having the same UL-DL Cfg are aggregated, M=1 and A=3.

TABLE 11

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

When a PCC corresponds to a MIMO CC and an SCC corresponds to a non-MIMO CC, $n^{(1)}_{PUCCH,0}$ and $n^{(1)}_{PUCCH,1}$ can be allocated implicit PUCCH resources linked to the PCC-PDCCH and $n^{(1)}_{PUCCH,2}$ can be allocated an implicit PUCCH resource linked to the SCC-PDCCH or an explicit PUCCH resource reserved through RRC according to whether or not cross-CC scheduling is applied. If the PCC corresponds to a non-MIMO CC and the SCC corresponds to a MIMO CC, $n^{(1)}_{PUCCH,0}$ can be allocated an implicit PUCCH resource linked to the PCC-PDCCH and $n^{(1)}_{PUCCH,1}$ and $n^{(1)}_{PUCCH,2}$ can be allocated implicit PUCCH resources linked to the SCC-PDCCH or explicit PUCCH resources reserved through RRC according to whether or not cross-CC scheduling is employed.

Table 12 is a mapping table for channel selection, defined in LTE-A when two CCs having the same UL-DL Cfg are aggregated, M≤2 and A=4.

TABLE 12

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Implicit PUCCH resources linked to a PDCCH (i.e. PCC-PDCCH) that schedules a PCC (or PCell) can be allocated to $n_{PUCCH,0}^{(1)}$ and/or $n_{PUCCH,1}^{(1)}$ irrespective of cross-CC scheduling and implicit PUCCH resource linked to a PDCCH (i.e. SCC-PDCCH) that schedules an SCC or explicit PUCCH resources reserved through RRC can be allocated to $n_{PUCCH,2}^{(1)}$ and/or $n_{PUCCH,3}^{(1)}$ according to whether or not cross-CC scheduling is applied. For example, when M=2 and cross-CC scheduling is applied, implicit PUCCH resources linked to PCC-PDCCHs of first and second DL SFs can be allocated to $n_{PUCCH,0}^{(1)}$ and $n_{PUCCH,1}^{(1)}$ and implicit PUCCH resources linked to SCC-PDCCHs of the first and second DL SFs can be allocated to $n_{PUCCH,2}^{(1)}$ and $n_{PUCCH,3}^{(1)}$.

Table 13 shows TBs, HARQ-ACK(j) and PUCCH resources when M=1.

TABLE 13

| | | | HARQ-ACK(j) | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |

TABLE 13-continued

| | | | HARQ-ACK(j) | |
|---|---|---|---|---|
| A | HARQ-ACK(0) | HARQ-ACK(1) | HARQ-ACK(2) | HARQ-ACK(3) |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

\* TB: transport block, NA: not available

| | | | HARQ-ACK(j) | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

Table 14 illustrates TBs, HARQ-ACK(j) and PUCCH resources when M=2.

A channel selection scheme using PUCCH format 1b when M>2 in the UL subframe n for HARQ-ACK transmission will now be described first. This channel selection scheme is similar to the channel selection scheme in case of M≤2. Specifically, the UE transmits an A/N signal using PUCCH format 1b in the UL subframe n according to Tables 15 and 16. When M>2 in the UL subframe n, $n_{PUCCH,0}^{(1)}$ and $n_{PUCCH,1}^{(1)}$ are related to DL transmission (e.g. PDSCH transmission) on the PCell and $n_{PUCCH,2}^{(1)}$ and $n_{PUCCH,3}^{(1)}$ are related to DL transmission (e.g. PDSCH transmission) on the SCell.

HARQ-ACK(i) for an arbitrary cell denotes an A/N response to a PDCCH (PDSCH corresponding thereto) on which DAI-c that schedules the cell is i+1. When a PDSCH w/o PDCCH is present, HARQ-ACK(0) may refer to an A/N response to the PDSCH w/o PDCCH and HARQ-ACK(1) may refer to an A/N response to a PDCCH (PDSCH corresponding thereto) on which DAI-c is i.

Table 15 is a mapping table for channel selection, defined in LTE-A when two CCs having the same UL-DL Cfg are aggregated and M=3.

TABLE 15

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, implicit PUCCH resources linked to PCC-PDCCHs corresponding to DAI-c of 1 and DAI-c of 2 can be allocated to $n^{(1)}_{PUCCH,0}$ and $n^{(1)}_{PUCCH,1}$, respectively, and implicit PUCCH resources linked to SCC-PDCCHs corresponding to DAI-c of 1 and DAI-c of 2 can be allocated to $n^{(1)}_{PUCCH,2}$ and $n^{(1)}_{PUCCH,3}$, respectively, in a TDD situation.

Table 16 is a mapping table for channel selection, defined in LTE-A when two CCs having the same UL-DL Cfg are aggregated and M=4.

TABLE 16

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |

TABLE 16-continued

| Primary Cell<br>HARQ-ACK(0),<br>HARQ-ACK(1),<br>HARQ-ACK(2),<br>HARQ-ACK(3) | Secondary Cell<br>HARQ-ACK(0),<br>HARQ-ACK(1),<br>HARQ-ACK(2),<br>HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | | No Transmission | 0, 0, 0, 0 |
| DTX, any, any, any | (ACK, NACK/DTX, any, any), except for (ACK, DTX, DTX, DTX) | | No Transmission | 0, 0, 0, 0 |

Here, $n^{(1)}_{PUCCH,0}$, $n^{(1)}_{PUCCH,1}$, $n^{(1)}_{PUCCH,2}$ and $n^{(1)}_{PUCCH,1}$ can be allocated as shown in Table 15.

A description will be given of a method for transmitting ACK/NACK by the UE when the UE is set in PUCCH format-3 mode in TDD CA with reference to FIG. 15.

FIG. 15 illustrates slot level PUCCH format 3. In PUCCH format 3, A/N information is transmitted through joint coding (e.g. Reed-Muller coding, tail-biting convolutional coding, etc.), block spreading and SC-FDMA modulation.

Referring to FIG. 15, a symbol sequence is transmitted over the frequency domain and OCC (orthogonal cover code) based time-domain spreading is applied to the symbol sequence. Control signals of a plurality of UEs can be multiplexed to the same RB using an OCC. Specifically, 5 SC-FDMA symbols (i.e. UCI data parts) are generated from one symbol sequence {d1, d2, ...,} using a length-5 OCC (C1 to C5). Here, the symbol sequence {d1, d2, ... } may be a modulation symbol sequence or a codeword bit sequence.

ACK/NACK payloads for PUCCH format 3 are respectively configured for respective cells and connected in order of cell index. Specifically, HARQ-ACK feedback bits for a c-th serving cell (or DL CC) are $O_{c,0}^{ACK}$, $O_{c,1}^{ACK}$, ..., $O^{ACK}_{c,O_c^{ACK}-1}$ (c≥0). Here, $O_c^{ACK}$ denotes the number (i.e. size) of HARQ-ACK payload bits for the c-th serving cell. When a transmission mode supporting single TB transmission is set or spatial bundling is applied to the c-th serving cell, $O_c^{ACK}$ can be set as $O_c^{ACK}=B_c^{DL}$. If a transmission mode supporting transmission of a plurality of (e.g. 2) TBs is set and spatial bundling is not applied to the c-th serving cell, $O_c^{ACK}$ can be set as $O_c^{ACK}=2B_c^{DL}$. When the HARQ-ACK payload bits are transmitted through a PUCCH, or W corresponding to a PUSCH is not present though the HARQ-ACK payload bits are transmitted through the PUSCH (e.g. in case of SPS based PUSCH), $B_c^{DL}$ is set as $B_c^{DL}=M$. Here, M represents the number of elements of set K defined in Table 4. When TDD UL-DL configurations correspond to #1, #2, #3, #4 and #6 and the HARQ-ACK payload bits are transmitted through a PUSCH, $B_c^{DL}=W_{DAI}^{UL}$. Here, $W_{DAI}^{UL}$, denotes a value indicated by a UL DAI field in a UL grant PDCCH and is simply represented as W. In case of TDD UL-DL configuration #5, $B_c^{DL}=W_{DAI}^{UL}+4\lceil(U-W_{DAI}^{UL})/4\rceil$. Here, U denotes a maximum value from among Ucs, Uc representing the total number of PDSCH(s) received in a subframe n−k and PDCCHs indicating (downlink) SPS release in the c-th serving cell. A subframe n is a subframe in which HARQ-ACK feedback bits are transmitted. $\lceil\ \rceil$ represents a ceiling function.

When a transmission mode supporting single TB transmission is set or spatial bundling is applied to the c-th serving cell, the position of each ACK/NACK in the HARQ-ACK payload of the c-th serving cell is given as $o_{c,DAI(k)-1}^{ACK}$. Here, DAI(k) represents a DL DAI value of a PDCCH detected from a DL subframe n−k. If a transmission mode supporting transmission of a plurality of (e.g. 2) TBs is set and spatial bundling is not applied to the c-th serving cell, the position of each ACK/NACK in the HARQ-ACK payload of the c-th serving cell is given as $o_{c,2DAI(k)-2}^{ACK}$ and $o_{c,2DAI(k)-1}^{ACK}$. $o_{c,2DAI(k)-2}^{ACK}$ represents HARQ-ACK for codeword 0 and $o_{c,2DAI(k)-1}^{ACK}$ represents HARQ-ACK for codeword 1. Codewords 0 and 1 respectively correspond to TBs 0 and 1 or TBs 1 and 0 according to swiping. When PUCCH format 3 is transmitted through a subframe set for SR transmission, PUCCH format 3 is transmitted with ACK/NACK bits and 1-bit SR.

EMBODIMENT

A/N Transmission when CCs (or Cells) Having Different UL-DL Configurations are Aggregated A beyond LTE-A system based on TDD may consider aggregation of a plurality of CCs in different UL-DL configurations. In this case, different A/N timings (i.e. UL SF timing at which A/N with respect to DL data transmitted through each DL SF is transmitted) may be set to a PCC and an SCC according to UL-DL configurations of the corresponding CCs. For example, for the same DL SF timing (DL data transmitted at the DL SF timing), UL SF timing at which A/N is transmitted can be set differently for the PCC and the SCC, and a DL SF group for which A/N feedback transmitted at the same UL SF timing can be set differently for the PCC and the SCC. Furthermore, link directions (i.e. DL or UL) of the PCC and the SCC may be different from each other for the same SF timing. For example, the SCC can be set to a UL SF at specific SF timing, whereas the PCC can be set to a DL SF at the same SF timing.

In addition, the beyond LTE-A system based on TDD may support cross-CC scheduling in CA based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set to an MCC (monitoring CC) and an SCC. For example, a DL SF in which a UL grant/PHICH is transmitted can be set differently in the MCC and SCC for the same UL SF. Furthermore, a UL SF group for which UL grant or PHICH feedback is transmitted in the same DL SF can be set differently for the MCC and the SCC. In this case, link directions of the MCC and the SCC may differ at the same SF timing. For example, specific SF timing can be set to a DL SF in which a UL grant/PHICH will be transmitted in case of the SCC, whereas the SF timing can be set to a UL SF in case of the MCC.

When SF timing (referred to as collided SF hereinafter) at which link directions of the PCC and SCC differ from each other due to different TDD CA configurations is present, only a CC from the PCC and SCC, which has a specific link direction or the same link direction as that of a specific CC (e.g. PCC), can be handled at the SF timing due to hardware configuration of the UE or for other reasons/purposes. This scheme is called HD (Half-Duplex)-TDD CA for convenience. For example, when a collided SF is generated since specific SF timing is set to a DL SF in case of the PCC and the SF timing is set to a UL SF in case of the SCC, only the PCC (i.e. DL SF set to the PCC) having DL direction may be handled and the SCC (i.e. UL SF set to the SCC) having UL direction may not be handled at the SF timing (and vice versa). In this situation, to transmit A/N feedback for DL data, transmitted through DL SFs of all CCs, through the PCC, identical or different A/N timings (set to a specific UL-DL configuration) may be applied to CCs, or A/N timing set to a specific UL-DL configuration may be commonly applied to all CCs. Here, the specific UL-DL configuration (referred to as a reference configuration (Ref-Cfg)) can correspond to a UL-DL configuration set to the PCC or SCC or can be determined as a UL-DL configuration other than the UL-DL configuration set to the PCC or SCC.

In case of HD-TDD CA, the number of DL SFs (referred to as A/N-DL SFs) corresponding to A/N feedback targets may be set differently for the PCC and SCC at a single UL SF timing. In other words, when the number of DL SFs (A/N-DL SFs) corresponding to one UL SF is defined as M, M can be set per CC for one PCC UL SF (M per CC: Mc). When Ref-Cfg of a specific XCC (e.g. PCC or SCC) does not correspond to the UL-DL configuration (i.e. PCC-Cfg) of the PCC, an A/N-DL SF index of the XCC, set at PCC UL SF timing, may be different from an A/N-DL SF index when A/N timing of the PCC-Cfg is applied. Particularly, when a PUCCH resource linked to a CCE resource of a PDCCH that schedules DL data is called an implicit PUCCH, an implicit PUCCH may not be defined (in a PCC UL SF in which A/N with respect to an XCC DL SF will be transmitted) for the XCC DL SF (PDCCH that schedules DL data to be transmitted through the XCC DL SF) even in a cross-CC scheduling situation.

Figure 16:
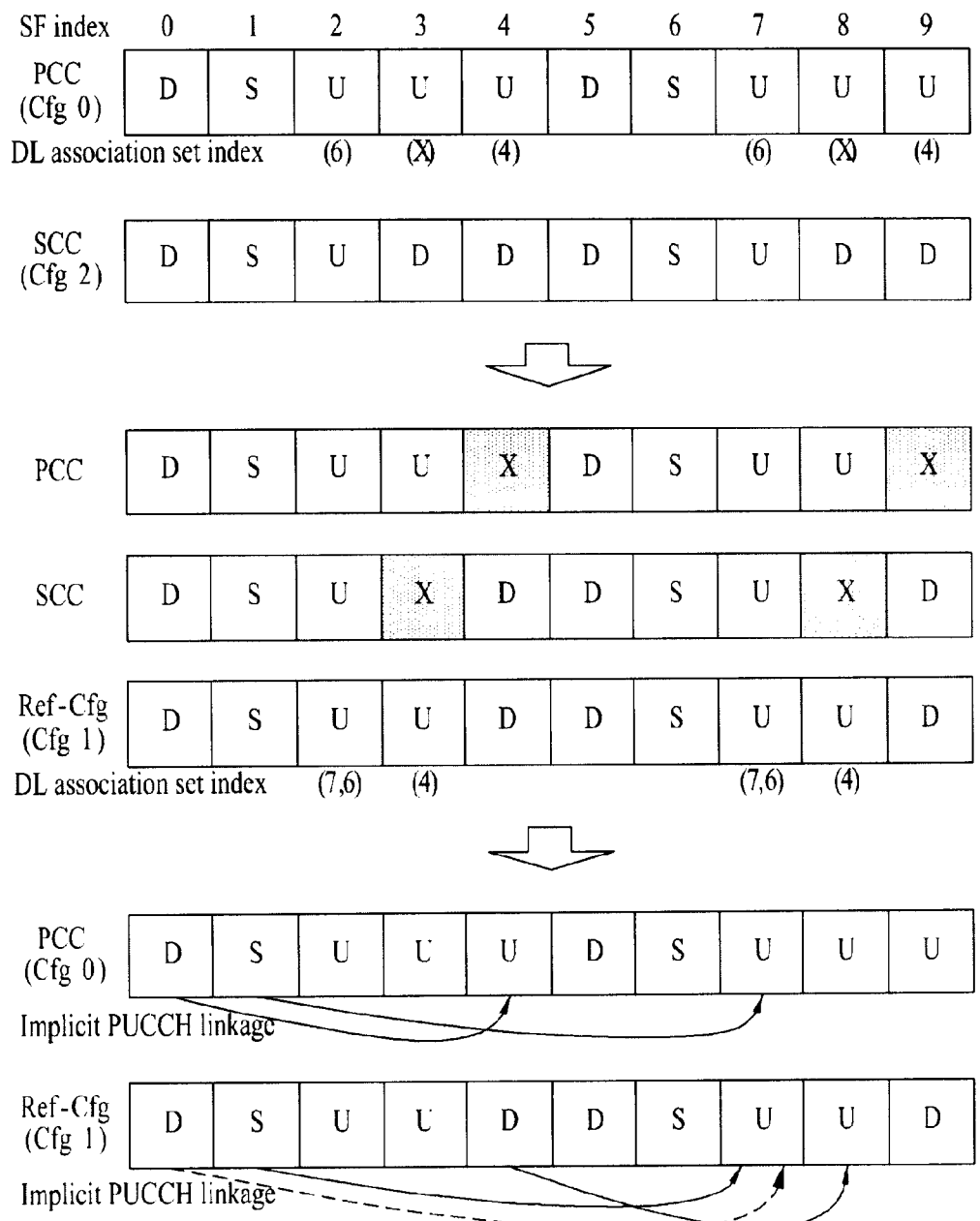
FIG. 16 illustrates an HD-TDD CA structure.

FIG. 16 illustrates an HD-TDD CA structure. In the figure, shaded parts X show CCs (link directions) that are restricted from being used in a collided SF and a dotted-line arrow represents a DL SF corresponding to an implicit PUCCH that is not linked to a PCC UL SF.

Figure 17:
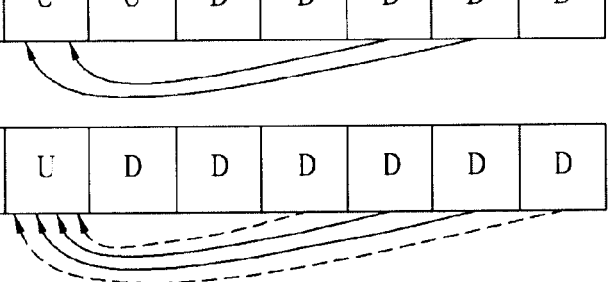
FIG. 17 illustrates an FD-TDD CA structure.

In the meantime, a scheme in which simultaneous UL/DL transmission and reception are permitted in a collided SF in which link directions of a PCC and an SCC differ from each other can be considered. This scheme is called FD (Full Duplex)-TDD CA. To transmit A/N feedback with respect to DL SFs of all CCs through one PCC UL SF in FD-TDD CA, identical or different A/N timings (set to Ref-Cfg) may be applied to CCs or A/N timing set to Ref-Cfg may be commonly applied to all CCs. Ref-Cfg may be identical to PCC-Cfg or SCC-Cfg or may be set to a UL-DL Cfg other than PCC-Cfg and SCC-Cfg. In FD-TDD CA, M can also be independently set per CC for one PCC UL SF and an implicit PUCCH may not be defined (in a PCC UL SF corresponding to an XCC DL SF) for the XCC DL SF even in a cross-CC scheduling situation. FIG. 17 illustrates an FD-TDD CA structure. In FIG. 17, dotted-line arrows represent DL SFs corresponding to an implicit PUCCH that is not linked to the PCC UL SF.

As described above, the number of DL subframes corresponding to a UL subframe (referred to as A/N subframe) in which A/N is transmitted can be changed according to CC (or cell) due to introduction of various TDD CA situations (e.g. aggregation of CCs having different UL-DL configurations, HD-TDD CA, FD-TDD CA, etc.) and/or definition of Ref-Cfg according to various TDD CA situations.

Embodiment 1

Setting of Ref-Cfg

The present invention provides a method for setting Ref-Cfg according to TDD CA and whether cross-CC scheduling is applied. In the present embodiment, a method using "solution F" is applicable to FD-TDD CA and a method using "solution H" is applicable to HD-TDD CA. Otherwise, the solutions can be applied to both FD-TDD and HD-TDD irrespective of TDD CA structure. For example, solution H2 can be applied to FD-TDD CA. In the present embodiment, D denotes a DL SF or a special SF and U denotes a UL SF. When a UL-DL configuration (UD-cfg) of a CC is (semi-)statically set through broadcast information or higher layer signaling, a subframe configuration of the CC can be determined based on Table 1.

In the following, application of ACK/NACK timing set to a specific CC (i.e. Ref-CC) or a specific UD-cfg (i.e. Ref-cfg) may mean use of a parameter corresponding to UD-Cfg of the specific CC or specific UD-cfg in Table 4. Similarly, application of UL grant or PHICH timing set to a specific CC (i.e. Ref-CC) or a specific UD-cfg (i.e. Ref-cfg) may mean use of a parameter corresponding to UD-Cfg of the specific CC or specific UD-cfg in Tables 5, 6 and 7. For convenience, Ref-CC (or Ref-cfg) for ACK/NACK timing can be referred to as A/N Ref-CC (or A/N Ref-cfg) or DL Ref-CC (or DL Ref-cfg). Similarly, Ref-CC (or Ref-cfg) for UL grant or PHICH timing can be referred to as UG/PHICH Ref-CC (or UG/PHICH Ref-cfg) or UL Ref-CC (or UL Ref-cfg).

[Solution F1 for FD-TDD CA]
ACK/NACK with respect to DL data transmitted on a PCC
  ACK/NACK timing set to the PCC is applied.
ACK/NACK with respect to DL data transmitted on an SCC
  ACK/NACK timing of a UL-DL configuration (i.e. DL union) having a smallest number of Ds from among UL-DL configurations in which all SFs having a PCC or SCC corresponding to D are set to D is applied. Equivalently, ACK/NACK timing of a UL-DL configuration (i.e. DL union) having a largest number of Us from among UL-DL configurations in which all SFs having a PCC or SCC corresponding to D are set to D is applied. If UL-DL configurations of Table 1 are used, DL union according to UL-DL configurations of the two CCs is as follows.

TABLE 17

| Set # | (PCC UL-DL Cfg, SCC UL-DL Cfg) | DL-Union UL-DL Cfg |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |

Table 17 is commonly applied when the DL union is determined in the specification. However, (PCC UL-DL Cfg, SCC UL-DL Cfg) can be replaced by (PCC UL-DL Cfg, MCC UL-DL Cfg), (MCC UL-DL Cfg, SCC UL-DL Cfg) or (SCC1 UL-DL Cfg, SCC2 UL-DL Cfg) in Table 17 according to CC combination for determining the DL union.

[Solution F2 for FD-TDD CA]
ACK/NACK with respect to DL data transmitted on a PCC
  ACK/NACK timing set to the PCC is applied.
ACK/NACK with respect to DL data transmitted on an SCC
  Non-cross-CC scheduling: ACK/NACK timing set to a DL union of a PCC and an SCC is applied.
  Cross-CC scheduling: ACK/NACK timing set to a DL union of a PCC and an MCC is applied. The MCC refers to a CC configured to cross-CC-schedule an SCC.
    Collided SF corresponding to an MCC set to U and an SCC set to D: scheduling for D of the SCC can be abandoned/restricted. In this case, the collided SF can be excluded from available DL SFs in terms of ACK/NACK. That is, ACK/NACK timing may not be defined for the collided SF. Accordingly, the collided SF may not be considered in a process of determining an ACK/NACK payload size, a process of determining an ACK/NACK bit position, a process of determining the number of HARQ processes, etc. Alternatively, the collided SF can always be handled as NACK, DTX or NACK/DTX.

[Solution F2-1 for FD-TDD CA]
ACK/NACK with respect to DL data transmitted on a PCC
  ACK/NACK timing set to the PCC is applied.
ACK/NACK with respect to DL data transmitted on an SCC
  Non-cross-CC scheduling: ACK/NACK timing set to a DL union of a PCC and an SCC is applied.
  Cross-CC scheduling: ACK/NACK timing set to a DL union of a PCC and ULU-cfg is applied. ULU-cfg represents a virtual UL-DL configuration in which all SFs corresponding to an SCC or MCC set to U are U and the remaining SFs (i.e. SFs corresponding to the SCC and MCC set to D) are set to D. Alternatively, when a DL-UL configuration having a smallest number of Us from among DL-UL configurations in which all SFs having an SCC or MCC corresponding to U are set to U is defined as "UL union", ACK/NACK timing set to a DL union of a PCC and the UL union can be finally applied.
    Collided SF corresponding to an MCC set to U and an SCC set to D: scheduling for D of the SCC can be abandoned/restricted. (In this case, the collided SF can be excluded from available DL SFs or handled as NACK (or DTX or NACK/DTX).)

[Solution F2-2 for FD-TDD CA]
ACK/NACK with respect to DL data transmitted on a PCC
  ACK/NACK timing set to the PCC is applied.
ACK/NACK with respect to DL data transmitted on an SCC
  Non-cross-CC scheduling: ACK/NACK timing set to a DL union of a PCC and an SCC is applied.
  Cross-CC scheduling: ACK/NACK timing set to a DL union of a PCC and an SCC is applied.
    Collided SF having an MCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution F3 for FD-TDD CA]
ACK/NACK with respect to DL data transmitted on a PCC
  ACK/NACK timing set to the PCC is applied.
ACK/NACK with respect to DL data transmitted on an SCC (Alt F3-1: case in which the SCC is set such that the SCC is scheduled by another CC is defined as cross-CC scheduling)
  Non-cross-CC scheduling: ACK/NACK timing set to a DL union of a PCC and an SCC is applied.
  Cross-CC scheduling: ACK/NACK timing set to a PCC is applied.
    Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).
ACK/NACK with respect to DL data transmitted on an SCC (Alt F3-2: only a case in which the SCC is set such that the SCC is scheduled by a PCC is defined as cross-CC scheduling)
  Non-cross-CC scheduling: ACK/NACK timing set to a DL union of a PCC and an SCC is applied.
    Collided SF having an MCC corresponding to U and an SCC corresponding to D: scheduling for D of the SCC can be abandoned/restricted. (In this case, the collided SF can be excluded from available DL SFs or handled as NACK (or DTX or NACK/DTX).)
  Cross-CC scheduling: ACK/NACK timing set to a PCC is applied.
    Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution H1 for HD-TDD CA]

ACK/NACK with respect to DL data transmitted on a PCC
ACK/NACK timing set to the PCC is applied.

ACK/NACK with respect to DL data transmitted on an SCC
ACK/NACK timing set to the PCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution H2 for HD-TDD CA]

ACK/NACK with respect to DL data transmitted on a PCC
ACK/NACK timing set to the PCC is applied.

ACK/NACK with respect to DL data transmitted on an SCC
Non-cross-CC scheduling: ACK/NACK timing set to a PCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)
Cross-CC scheduling: ACK/NACK timing set to a PCC is applied.
Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution H2-1 for HD-TDD CA]

ACK/NACK with respect to DL data transmitted on a PCC
ACK/NACK timing set to the PCC is applied.

ACK/NACK with respect to DL data transmitted on an SCC
Non-cross-CC scheduling: ACK/NACK timing set to a DL union of a PCC and an SCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)
Cross-CC scheduling: ACK/NACK timing set to a DL union of a PCC and an SCC is applied.
Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution H2-2 for HD-TDD CA]

ACK/NACK with respect to DL data transmitted on a PCC
ACK/NACK timing set to the PCC is applied.

ACK/NACK with respect to DL data transmitted on an SCC (Alt H2-2-1: a case in which the SCC is set such that the SCC is scheduled by another CC is defined as cross-CC scheduling)
Non-cross-CC scheduling: ACK/NACK timing set to a DL union of a PCC and an SCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)
Cross-CC scheduling: ACK/NACK timing set to a PCC is applied.
Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).)

ACK/NACK with respect to DL data transmitted on an SCC (Alt H2-2-2: only a case in which the SCC is set such that the SCC is scheduled by a PCC is defined as cross-CC scheduling)
Non-cross-CC scheduling: ACK/NACK timing set to a DL union of a PCC and an SCC is applied.
Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).)
Cross-CC scheduling: ACK/NACK timing set to a PCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)

[Solution H3 for FD-TDD CA]

ACK/NACK with respect to DL data transmitted on a PCC
ACK/NACK timing set to the PCC is applied.

ACK/NACK with respect to DL data transmitted on an SCC
Non-cross-CC scheduling: ACK/NACK timing set to a DL union of a PCC and an SCC is applied.
Collided SF having a PCC corresponding to U and an SCC corresponding to D: scheduling for D of the SCC can be abandoned/restricted. (In this case, the collided SF can be excluded from available DL SFs or handled as NACK (or DTX or NACK/DTX).)
Cross-CC scheduling: ACK/NACK timing set to a DL union of a PCC and an MCC is applied.
Collided SF having a PCC or MCC corresponding to U and an SCC corresponding to D: scheduling for D of the SCC can be abandoned/restricted. (In this case, the collided SF can be excluded from available DL SFs or handled as NACK (or DTX or NACK/DTX).)

In the aforementioned method, a method of determining an SF having a PCC and an SCC which are set to D as an available DL SF irrespective of MCC link direction in case of cross-CC scheduling (particularly, a case in which an available DL SF is determined according to PCC/MCC/SCC link directions) can be used. (In this case, the corresponding SF can be used to determine a maximum number of DL HARQ processes). While this method may cause excessive partitioning in a HARQ reception buffer of the UE (which decreases HARQ reception buffer utilization efficiency), HARQ process related modules and hardware configuration of the UE can be simplified, compared to the proposed method in which available DL SFs depend on PCC/MCC/SCC link directions.

Considering the HD-TDD CA structure (particularly, a structure in which only the PCC link direction is used in a collided SF all the time), in the case of an SF corresponding to a PCC set to S and an SCC set to D (and/or S) (when a DL SF and a special SF are represented as D and S), successful DL data detection/reception may not be easily performed in D (and/or S) of the SCC due to DL/UL switching in the PCC and thus DL data scheduling for D (and/or S) of the SCC may be additionally restricted or may not be permitted. Accordingly, the present invention additionally proposes a method of restricting or omitting scheduling for D (and/or S) of the SCC even in a collided SF corresponding to a PCC set to S and an SCC set to D (and/or S) (that is, the collided SF is excluded from available DL SFs). Based on this method, solutions H1 to H3 can be revised as follows in consideration of a case in which a PCC and an MCC do not correspond to each other.

[Solution H1 for HD-TDD CA] revised
ACK/NACK with respect to DL data transmitted on a PCC
  ACK/NACK timing set to the PCC is applied.
ACK/NACK with respect to DL data transmitted on an SCC
  ACK/NACK timing set to the PCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).

[Solution H2 for HD-TDD CA]—revised
ACK/NACK with respect to DL data transmitted on a PCC
  ACK/NACK timing set to the PCC is applied.
ACK/NACK with respect to DL data transmitted on an SCC
  Non-cross-CC scheduling: ACK/NACK timing set to a PCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).
  Cross-CC scheduling: ACK/NACK timing set to a PCC is applied.
    The eNB can support/perform DL scheduling for an SCC and the UE can attempt to detect/receive DL data only in an SF in which (PCC, MCC, SCC)=(D, D or S, D or S) or (PCC, MCC, SCC)=(S, D or S, S) (that is, the SF is determined as an available DL SF).

[Solution H2-1 for HD-TDD CA]—revised
ACK/NACK with respect to DL data transmitted on a PCC
  ACK/NACK timing set to the PCC is applied.
ACK/NACK with respect to DL data transmitted on an SCC
  Non-cross-CC scheduling: ACK/NACK timing set to a DL union of a PCC and an SCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).
  Cross-CC scheduling: ACK/NACK timing set to a DL union of a PCC and an SCC is applied.
    The eNB can support/perform DL scheduling for an SCC and the UE can attempt to detect/receive DL data only in an SF in which (PCC, MCC, SCC)=(D, D or S, D or S) or (PCC, MCC, SCC)=(S, D or S, S) (that is, the SF is determined as an available DL SF).

[Solution H2-2 for HD-TDD CA]—revised
ACK/NACK with respect to DL data transmitted on a PCC
  ACK/NACK timing set to the PCC is applied.
ACK/NACK with respect to DL data transmitted on an SCC Alt H2-2-1: All Cases in which the SCC is Set Such that the SCC is Scheduled by Another CC are Defined as Cross-CC Scheduling
  Non-cross-CC scheduling: ACK/NACK timing set to a DL union of a PCC and an SCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).
  Cross-CC scheduling: ACK/NACK timing set to a PCC is applied.
    When a PCC does not correspond to an MCC: the eNB can support/perform DL scheduling for an SCC and the UE can attempt to detect/receive DL data only in an SF in which (PCC, MCC, SCC)=(D, D or S, D or S) or (PCC, MCC, SCC)=(S, D or S, S) (that is, the SF is determined as an available DL SF).
    When a PCC corresponds to an MCC: the eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).

Alt H2-2-2: Only a Case in which an SCC is Set Such that the SCC is Scheduled by a PCC is Defined as Cross-CC Scheduling
  Non-cross-CC scheduling: ACK/NACK timing set to a DL union of a PCC and an SCC is applied.
    When an MCC corresponds to an SCC: the eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).
    When an MCC does not correspond to an SCC: the eNB can support/perform DL scheduling for an SCC and the UE can attempt to detect/receive DL data only in an SF in which (PCC, MCC, SCC)=(D, D or S, D or S) or (PCC, MCC, SCC)=(S, D or S, S) (that is, the SF is determined as an available DL SF).
  Cross-CC scheduling: ACK/NACK timing set to a PCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).

Alt H2-2-3: All Cases in which the SCC is Set Such that the SCC is Scheduled by Another CC are Defined as Cross-CC Scheduling
  Non-cross-CC scheduling: ACK/NACK timing set to a DL union of a PCC and an SCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).
  Cross-CC scheduling: ACK/NACK timing set to a PCC is applied.
    The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).

[Solution H3 for FD-TDD CA]—revised

ACK/NACK with respect to DL data transmitted on a PCC ACK/NACK timing set to the PCC is applied.

ACK/NACK with respect to DL data transmitted on an SCC

Non-cross-CC scheduling: ACK/NACK timing set to a DL union of a PCC and an SCC is applied.

The eNB can support/perform DL scheduling for an SCC and the UE can attempt to detect/receive DL data only in an SF in which (PCC, SCC)=(D, D or S) or (PCC, SCC)=(S, S) (that is, the SF is determined as an available DL SF).

Cross-CC scheduling: ACK/NACK timing set to a DL union of a PCC and an MCC is applied.

The eNB can support/perform DL scheduling for an SCC and the UE can attempt to detect/receive DL data only in an SF in which (PCC, MCC, SCC)=(D, D or S, D or S) or (PCC, MCC, SCC)=(S, D or S, S) (that is, the SF is determined as an available DL SF).

In the aforementioned proposed method, the UE can operate upon considering that DL data is not scheduled/transmitted in D (or S) (i.e. unavailable DL SF) of an SCC for which scheduling is abandoned/restricted. For example, the UE can omit DL data detection/reception in an unavailable DL SF. In addition, A/N feedback/timing corresponding to the unavailable DL SF may not be defined/set. Otherwise, the UE can operate upon considering that DL data is scheduled/transmitted only in D (or S) (i.e. available DL SF) of an SCC for which scheduling is not abandoned/restricted. For example, the UE can perform DL data detection/reception only in an available DL SF. Furthermore, only A/N feedback/timing corresponding to the available DL SF can be defined/set.

UE operation can be defined as follows in terms of DL data detection/reception.

Collided SF corresponding to an MCC set to U and an SCC set to D: the UE abandons/restricts scheduling for D of the SCC.

The UE attempts to detect/receive DL data through D of the SCC only in an SF corresponding to an MCC and SCC set to D.

Collided SF corresponding to a PCC or MCC set to U and an SCC set to D: the UE abandons/restricts scheduling for D of the SCC.

The UE attempts to detect/receive DL data through D of the SCC only in an SF corresponding to a PCC, MCC and SCC which are set to D.

Collided SF corresponding to a PCC set to U and an SCC set to D: the UE abandons/restricts scheduling for D of the SCC.

The UE attempts to detect/receive DL data through D of the SCC only in an SF corresponding to a PCC and SCC set to D.

A/N timing with respect to an SCC in FD-TDD CA can be applied as follows.

Non-cross-CC scheduling: only A/N timing with respect to SF timing at which the SCC is D (or S) is extracted from A/N timings of Ref-Cfg and applied.

Cross-CC scheduling: only A/N timing with respect to SF timing (DL data scheduling for the SCC is defined/permitted only at the SF timing) at which both the SCC and an MCC are D (or S) is extracted from A/N timings of Ref-Cfg and applied.

In addition, A/N timing with respect to an SCC in HD-TDD CA can be applied as follows.

Non-cross-CC scheduling: only A/N timing with respect to SF timing at which (PCC, SCC)=(D, D or S) or (PCC, SCC)=(S, S) is extracted from A/N timings of Ref-Cfg and applied.

Cross-CC scheduling: 1) only A/N timing with respect to SF timing at which (PCC, MCC, SCC)=(D, D or S, D or S) or (PCC, MCC, SCC)=(S, D or S, S) is extracted from A/N timings of Ref-Cfg and applied when the PCC does not correspond to the MCC and only A/N timing with respect to SF timing at which (PCC, SCC)=(D, D or S) or (PCC, SCC)=(S, S) is extracted from A/N timings of Ref-Cfg and applied when the PCC corresponds to the MCC or 2) only A/N timing with respect to SF timing at which (PCC, SCC)=(D, D or S) or (PCC, SCC)=(S, S) is extracted from A/N timings of Ref-Cfg and applied.

Figure 18:
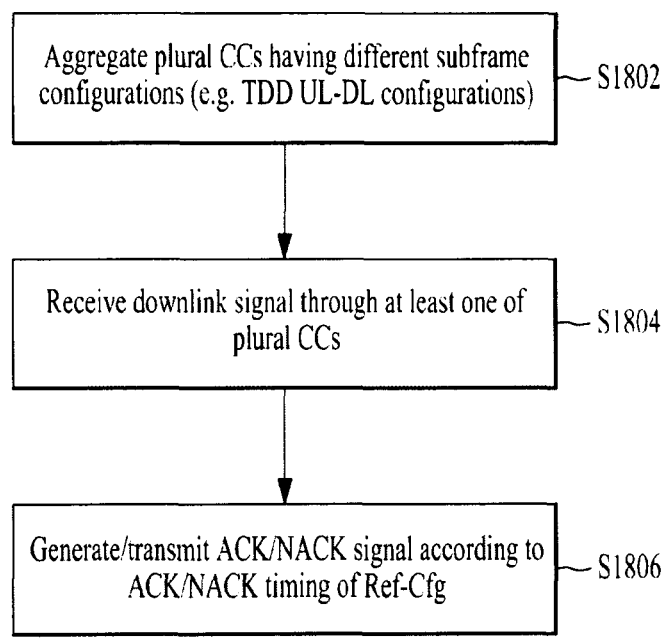
FIG. 18 illustrates exemplary A/N transmission according to the present invention.

FIG. 18 illustrates exemplary A/N transmission according to the present embodiment. While FIG. 18 illustrates operation of a UE for convenience, it is apparent that operation corresponding to the UE operation can be performed by an eNB.

Referring to FIG. 18, the UE aggregates plural CCs (S1802). Here, the CCs may have different subframe configurations (e.g. different TDD UL-DL configurations). The UE receives a DL signal (e.g. PDSCH, SPS release PDCCH) that requires A/N feedback through at least one of the CCs (S1804). In this case, the UE may generate/transmit an A/N signal according to A/N timing of Ref-Cfg of the corresponding CC (S1806). Specifically, the A/N signal can be generated/transmitted according to a predetermined A/N transmission method (e.g. PUCCH format 1b+channel selection, PUCCH format 3, etc.). In addition, the UE may determine the number of HARQ-ACK bits per CC, a HARQ-ACK payload size, a HARQ-ACK bit position or the number of HARQ processes according to A/N timing of Ref-Cfg (Table 4).

When the DL signal is received on a PCC, A/N timing set to the PCC is applied (i.e. Ref-Cfg=PCC Cfg). When the DL signal is received on an SCC, A/N Ref-Cfg can be determined according to the aforementioned methods (e.g. F1 to F3 and H1 to H3 (including revisions).

Embodiment 2

The Number of HARQ Processes and Reception Buffer Size

A description will be given of a method for determining a maximum number of downlink HARQ processes that can be supported when ACK/NACK timing is applied in case of CA of CCs having different subframe configurations. CA of CCs having different subframe configurations includes CA of an FDD CC and a TDD CC or TDD CA of CCs having different UL-DL configurations. A description will be given of a method for determining a maximum number of downlink HARQ processes that can be supported when Ref-Cfg based ACK/NACK timing is applied in case of TDD CA of CCs having different UL-DL configurations for convenience. The fundamental rule of the proposed method is to determine the maximum number of DL HARQ processes with respect to a CC which is configured to conform to ACK/NACK timing of Ref-Cfg according to how many "available DL SFs" are included in an interval (i.e. interval in which the maximum number of DL HARQ processes is determined, which is referred to as maxHARQ-RTT) which includes a maximum number of DL SFs from among intervals of initial DL data timing (initial transmission-DL, inTx-DL) set to Ref- Cfg→ACK/NACK feedback→retransmission DL data timing (retransmission-DL, reTx-DL).

Table 18 shows combinations of (inTx-DL, reTx-DL) of maxHARQ-RTT per UL-DL Cfg. A plurality of (inTx-DL, reTx-DL) combinations corresponding to maxHARQ-RTT may be present in one Ref-Cfg. A maximum number of available DL SFs (with respect to a CC configured to conform to ACK/NACK timing of corresponding Ref-Cfg) which are included in each maxHARQ-RTT can be determined as the maximum number of DL HARQ processes (with respect to the CC) according to the method of the present invention. In case of FDD CC, maxHARQ-RTT can be fixed to a specific value (e.g. 8). For example, a combination of (inTx-DL, reTx-DL) corresponding to maxHARQ-RTT can be (SF #n, SF #(n+8)) in case of FDD CC.

TABLE 18

| UL-DL Cfg | maxHARQ-RTT #1 (inTx-DL, reTx-DL) | maxHARQ-RTT #2 (inTx-DL, reTx-DL) |
| --- | --- | --- |
| 0 | (SF #6, SF #(10 + 6)) | (SF #1, SF #(10 + 1)) |
| 1 | (SF #5, SF #(10 + 6)) | (SF #0, SF #(10 + 1)) |
| 2 | (SF #4, SF #(10 + 6)) | (SF #9, SF #(20 + 1)) |
| 3 | (SF #1, SF #(10 + 6)) | — |
| 4 | (SF #0, SF #(10 + 6)) | — |
| 5 | (SF #9, SF #(20 + 6)) | — |
| 6 | (SF #5, SF #(10 + 6)) | (SF #0, SF #(10 + 1)) |

Figure 19:
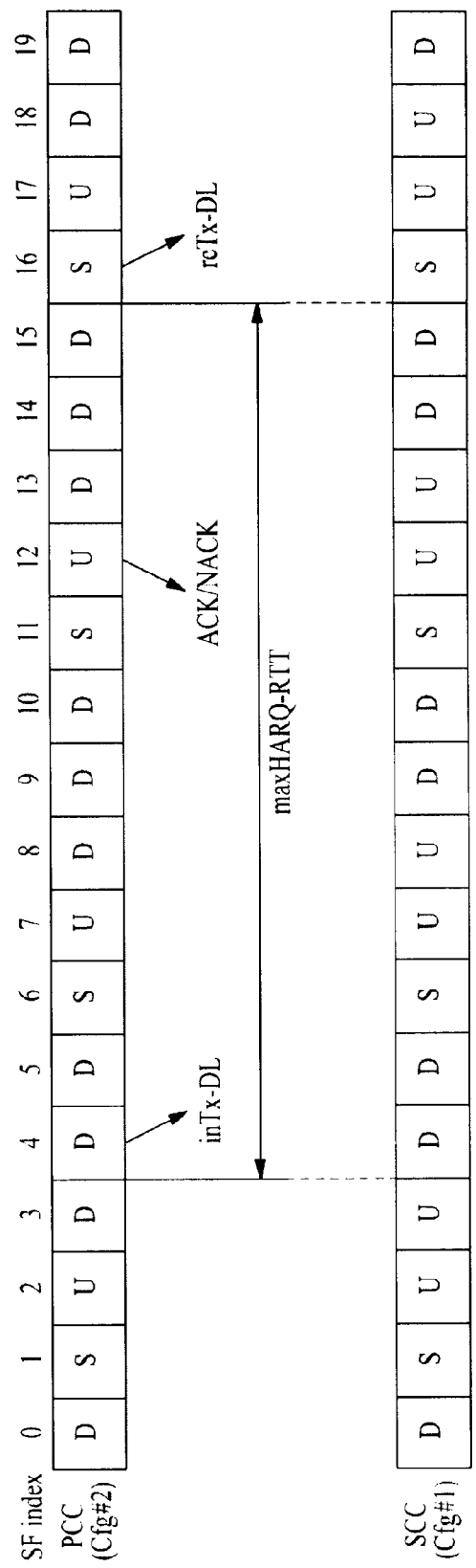
FIGS. 19 and 20 illustrate examples of determining a maximum number of DL HARQ processes according to the present invention.

FIG. 19 illustrates an example of determining a maximum number of DL HARQ processes according to the present invention. The example is based on the assumption that a PCC corresponds to Cfg #2, an SCC corresponds to Cfg #1 and solution F1 is applied.

Referring to FIG. 19, in the case of PCC, the maximum number of DL HARQ processes is determined as 10 since UL-DL configuration (i.e. Cfg #2) thereof is set to Ref-Cfg for ACK/NACK timing. Here, (inTx-DL, reTx-DL) of maxHARQ-RTT can be (SF #4, SF #(10+6)). In the case of SCC, Cfg #2 corresponding to a UL-DL configuration (i.e. DL union) having a smallest number of Ds, from among UL-DL configurations in which all SFs corresponding to PCC (Cfg #2) or SCC (Cfg #1) set to D are set to D, is set to Ref-Cfg. A maximum number of DL HARQ processes with respect to the SCC can be determined as 8 since the number of DL SFs of the SCC (Cfg #1) within the interval of (inTx-DL, reTx-DL)= (SF #4, SF #(10+6)) corresponding to maxHARQ-RTT of Cfg #2 is 8.

Figure 20:
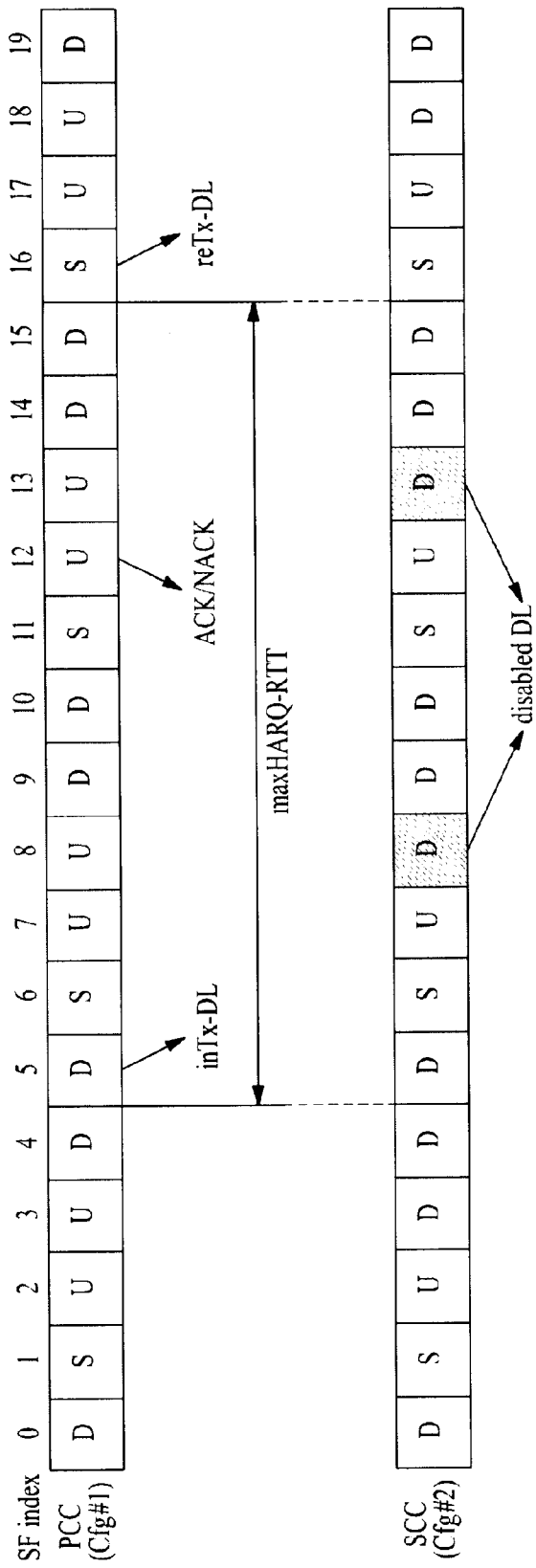

FIG. 20 illustrates another example of determining a maximum number of DL HARQ processes according to the present invention. This example is based on the assumption that a PCC corresponds to Cfg #1, an SCC corresponds to Cfg #2 and solution F2 is applied.

Referring to FIG. 20, when non-cross-CC scheduling is set, a maximum number of DL HARQ processes with respect to the PCC is determined as 7 since UL-DL configuration (i.e. Cfg #1) of the PCC is set to Ref-Cfg. In the case of SCC, Cfg #2 corresponding to the DL union of the PCC (Cfg #1) and SCC (Cfg #2) is set to Ref-Cfg, and thus a maximum number of DL HARQ processes with respect to the SCC can be determined as 10. When the PCC is configured to cross-CC-schedule the SCC, the UL-DL configuration (i.e. Cfg #1) of the PCC is set to Ref-Cfg for both the PCC and SCC. The number of available DL SFs (i.e. DL SFs of the SCC other than collided SFs #8 and #(10+3) in which the PCC is U and the SCC is D) of the SCC within the interval of (inTx-DL, reTx-DL)=(SF #5, SF #(10+6)) corresponding to max-HARQ-RTT of Cfg #1 is 7. Accordingly, the maximum numbers of DL HARQ processes with respect to the PCC and SCC can be determined as 7.

With regard to solution F2, a case in which PCC, SCC1 and SCC2 respectively correspond to Cfg #2, Cfg #1 and Cfg #2 is exemplified. In non-cross-CC scheduling, Cfg #2 is set to Ref-Cfg in the case of PCC, Cfg #2 corresponding to DL union of the PCC and SCC1 is set to Ref-Cfg in the case of SCC1 and Cfg #2 corresponding to DL union of the PCC and SCC2 is set to Ref-Cfg in the case of SCC2. Accordingly, the maximum numbers of DL HARQ processes with respect to PCC, SCC1 and SCC2 are respectively determined as 10, 8 and 10. When the PCC is set to (cross-CC)-schedule only the PCC and SCC1 is set to (cross-CC)-schedule SCC1 and SCC2, the maximum numbers of DL HARQ processes with respect to PCC and SCC1 can be respectively determined as 10 and 8 since PCC and SCC1 have a non-cross-CC scheduling relationship. In the case of SCC2, Cfg #2 corresponding to DL union of PCC and SCC1 (i.e. MCC with respect to SCC2) is set to Ref-Cfg. The number of available DL SFs (i.e. DL SFs of SCC2 other than collided SFs #8 and #(10+3) in which SCC1 is U and SCC2 is D) of SCC2 within the interval of (inTx-DL, reTx-DL)=(SF #5, SF #(10+6)) corresponding to maxHARQ-RTT of Cfg #2 is 8. Accordingly, the maximum number of DL HARQ processes with respect to SCC2 can be determined as 8.

With regard to solution F2-1, a case in which PCC, SCC1 and SCC2 respectively correspond to Cfg #4, Cfg #5 and Cfg #3 is exemplified. In non-cross-CC scheduling, Cfg #4 is set to Ref-Cfg in the case of PCC, Cfg #5 corresponding to DL union of the PCC and SCC1 is set to Ref-Cfg in the case of SCC1 and Cfg #4 corresponding to DL union of the PCC and SCC2 is set to Ref-Cfg in the case of SCC2. Accordingly, the maximum numbers of DL HARQ processes with respect to PCC, SCC1 and SCC2 are respectively determined as 12, 15 and 10 (i.e. the number of DL SFs of Cfg #3 corresponding to SCC2 within maxHARQ-RTT of Cfg #4 corresponding to Ref-Cfg). When the PCC is set to (cross-CC)-schedule only the PCC and SCC1 is set to (cross-CC)-schedule SCC1 and SCC2, the maximum numbers of DL HARQ processes with respect to PCC and SCC1 can be respectively determined as 12 and 15 since PCC and SCC1 are in a non-cross-CC scheduling relationship. In the case of SCC2, Cfg #4 corresponding to DL union of ULU-cfg (corresponding to Cfg #3 in this example) of SCC2 and SCC1 (configured as an MCC of SCC2) and PCC is set to Ref-Cfg. The number of available DL SFs (i.e. DL SFs of SCC2 other than collided SFs (which are not present in this example) in which SCC1 is U and SCC2 is D) of SCC2 within the interval of (inTx-DL, reTx-DL)=(SF #0, SF #(10+6)) corresponding to maxHARQ-RTT of Cfg #4 is 10. Accordingly, the maximum number of DL HARQ processes with respect to SCC2 can be determined as 10. If solution F2 is applied, Cfg #5 corresponding to DL union of SCC1 and PCC is set to Ref-Cfg. Since the number of available DL SFs of SCC2 within the interval of (inTx-DL, reTx-DL)=(SF #9, SF #(20+6)) corresponding to maxHARQ-RTT of Cfg #5 is 11, the maximum number of DL HARQ processes with respect to SCC2 can be determined as 11.

With regard to solution F2-2, the number of DL HARQ processes per CC can be determined by a similar method to solution F2. Particularly, in the case of SCC, DL union of a PCC and SCC is set to Ref-Cfg and the number of available DL SFs of the SCC within maxHARQ-RTT of Ref Cfg can be determined as the maximum number of DL HARQ processes with respect to the SCC. Here, an available DL SF corresponds to a DL SF of an SCC other than collided SFs corresponding to an MCC set to U and the SCC set to D.

In the case of solution F3, the number of DL HARQ processes per CC can be determined through a similar method to solution F2. Particularly, in the case of SCC, Cfg of a PCC is set to Ref-Cfg and the number of available DL SFs of the SCC within maxHARQ-RTT of Ref Cfg can be determined as the maximum number of DL HARQ processes with respect to the SCC. Here, an available DL SF corresponds to a DL SF of an SCC other than collided SFs corresponding to a PCC or MCC set to U and the SCC set to D.

Solution H1 when a PCC corresponds to Cfg #3 and an SCC corresponds to Cfg #4 is described. Cfg (i.e. Cfg #3) of the PCC is set to Ref-Cfg for both the PCC and SCC and the number of available DL SFs (i.e. DL SFs of the SCC other than collided SFs in which the PCC is U and the SCC is D) of the SCC (Cfg #4) in (inTx-DL, reTx-DL)=(SF #1, SF #(10+6)) corresponding to maxHARQ-RTT of Cfg #3 is 9. Accordingly, the maximum numbers of DL HARQ processes with respect to the PCC and SCC can be determined as 9.

A description will be given of solution H2 when PCC, SCC1 and SCC2 respectively correspond to Cfg #4, Cfg #3 and Cfg #5. In the case of non-cross-CC scheduling, Cfg (i.e. Cfg #4) of the PCC is set to Ref-Cfg for all CCs. The number of available DL SFs (i.e. DL SFs of SCC1 other than collided SFs in which the PCC is U and SCC1 is D (which are not present in this example)) of SCC1 within the interval of (inTx-DL, reTx-DL)=(SF #0, SF #(10+6)) corresponding to maxHARQ-RTT of Cfg #4 is 10 and the number of DL SFs (i.e. DL SFs of SCC2 other than collided SFs in which the PCC is U and SCC2 is D) of SCC2 is 12. Accordingly, the maximum numbers of DL HARQ processes with respect to PCC, SCC1 and SCC2 can be respectively determined as 12, 10 and 12. When the PCC is set to (cross-CC)-schedule only the PCC and SCC1 is set to (cross-CC)-schedule SCC1 and SCC2, the maximum numbers of DL HARQ processes with respect to PCC and SCC1 can be respectively determined as 12 and 10 since PCC and SCC1 are in a non-cross-CC scheduling relationship. In the case of SCC2, Cfg of the PCC is set to Ref-Cfg. The number of available DL SFs (i.e. DL SFs of SCC2 other than collided SFs #3, #4, #(10+3) and #(10+4) in which the PCC or SCC1 is U and SCC2 is D) of SCC2 within the interval of (inTx-DL, reTx-DL)=(SF #0, SF #(10+6)) corresponding to maxHARQ-RTT of Cfg #4 is 10. Accordingly, the maximum number of DL HARQ processes with respect to SCC2 can be determined as 10.

In the case of solutions H2-1, H2-2 and H3, the number of DL HARQ processes per CC can be determined through a similar method to solution H2. Particularly, in the case of SCC, DL union of a PCC and SCC is set to Ref-Cfg and the number of available DL SFs (i.e. DL SFs of the SCC other than collided SFs in which the PCC is U and the SCC is D) of the SCC in maxHARQ-RTT of Ref-Cfg is determined as the maximum number of DL HARQ processes with respect to the SCC when non-cross-CC scheduling is applied. When cross-CC scheduling is applied, DL union (solution H2-1) of the PCC and SCC, Cfg (solution H2-2) of the PCC or DL union (solution H3) of the PCC and an MCC configured to cross-CC-schedule the SCC is set to Ref-Cfg. The number of available DL SFs (i.e. DL SFs of the SCC other than collided SFs in which the PCC or MCC is U and the SCC is D) of the SCC can be determined as the maximum number of DL HARQ processes with respect to the SCC.

Alternatively, to facilitate setting of DL HARQ timing (related to DL grant PDCCH transmission and ACK/NACK feedback) and allocation of the number of DL HARQ processes in HD-TDD CA and FD-TDD CA, an MCC configured to cross-CC-schedule an SCC is limited to only CCs having the same UL-DL Cfg as the SCC or the same UL-DL Cfg as a PCC when the SCC and the PCC have different UL-DL Cfgs. When the SCC and the PCC have the same UL-DL Cfg, the MCC may be set to a CC having the same UL-DL Cfg as the SCC/PCC or a different UL-DCL Cfg.

In the case of specific CA (CA of CCs (e.g. FDD CC and TDD CC) having different SF structures) including CA of TDD CCs having different UL-DL Cfgs, different maximum numbers of DL HARQ processes can be allocated to CCs (based on whether cross-CC scheduling is applied (and/or TDD CA (FD or HD) structure). Accordingly, a parameter $n_{SB}$ (Equation 4) for determining the number/range of reception soft channel bits that a UE needs to store per CC needs to be corrected in consideration of the maximum number ($M_{DL\_HARQ}$) of DL HARQ processes, which can be allocated per CC (and/or according to whether cross-CC scheduling is applied (and/or TDD CA (FD or HD) structure)).

Equation 5 represents a reception soft buffer size proposed by the present invention.

Specifically, the present invention proposes a method for calculating $n_{SB}$ which determines the number/range of reception soft channel bits that need to be stored per CC through Equation 5 or 6 when the maximum number of DL HARQ processes of CC #n (n=0, . . . , $N_{cells}^{DL}$) is defined as $M_{DL\_HARQ,n}$.

In Equations 5 and 6, $M_{DL\_HARQ,n}$ can be set depending on whether cross-CC scheduling is applied (and/or TDD CA (FD or HD) structure) as described above. Even when Equation 4 is applied (e.g. a maximum value of numbers of DL HARQ processes of respective CCs is applied as $M_{DL\_HARQ,n}$) in order to calculate $n_{SB}$, $M_{DL\_HARQ,n}$ can be set depending on whether cross-CC scheduling is applied (and/or TDD CA (FD or HD) structure).

$$n_{SB} = \min\left(N_{cb}, \left\lfloor \frac{N'_{soft}}{C \cdot \sum_{n=0}^{N_{cells}^{DL}-1} \min(M_{DL\_HARQ,n}, M_{limit}) \cdot K_{MIMO}} \right\rfloor\right) \quad \text{[Equation 5]}$$

$$n_{SB} = \min\left(N_{cb}, \left\lfloor \frac{N'_{soft}}{C \cdot \min\left(\sum_{n=0}^{N_{cells}^{DL}-1} M_{DL\_HARQ,n}, N_{cells}^{DL} \cdot M_{limit}\right) \cdot K_{MIMO}} \right\rfloor\right) \quad \text{[Equation 6]}$$

Here, $N_{cb}$, $N_{soft}'$, C, $K_{MIMO}$ and $M_{limit}$ are as described with reference to Equations 1 to 4. $N_{cells}^{DL}$ cells denotes the number of DL cells and $M_{DL\_HARQ,n}$ denotes the maximum number of DL HARQ processes of a DL cell n.

Alternatively, the method for determining the maximum number $M_{DL\_HARQ,n}$ of DL HARQ processes and parameter $M_{DL\_HARQ}$ can be applied differently according to whether scheduling for an SCC is set (i.e. cross-CC or non-cross-CC scheduling) and/or whether the UE is permitted to perform simultaneous transmission and reception (i.e. FD-TDD CA or HD-TDD CA) and/or DL SF set relationship between a PCC and an SCC (i.e. whether a DL SF set of the PCC is a superset set (case A) or subset (case B) of a DL SF set of the SCC (case A) or the DL SF set of the PCC does not correspond to a superset/subset of the DL SF set of the SCC (case C)).

For convenience, the aforementioned method for determining the maximum number of DL HARQ processes with respect to a CC, which is configured to conform ACK/NACK timing of corresponding Ref-Cfg, and parameter $M_{DL\_HARQ}$ based on the number of available DL SFs of the CC in max-HARQ-RTT set to the Ref-Cfg is referred to as "actual-DL based HARQp". A method for determining the maximum number of DL HARQ processes (Table 8) and parameter $M_{DL\_HARQ}$ defined in Ref-Cfg as the maximum number of DL HARQ processes with respect to a CC, which is configured to conform to ACK/NACK timing of Ref-Cfg, and parameter $M_{DL\_HARQ}$ is referred to as "Ref-Cfg-based HARQp".

In a preferred embodiment of the proposed method, actual-DL based HARQp is applied in case of cross-CC scheduling and Ref-Cfg-based HARQp is applied in case of non-cross-CC scheduling. In case of cross-CC scheduling, when cross-SF scheduling (i.e. a scheme in which a DL grant and DL data scheduled by the DL grant are transmitted through different SFs) is not permitted, DL SFs excluded from available DL SFs may be frequently generated. In this case, application of Ref-Cfg-based HARQp may cause excessive over-dimensioning for a HARQ reception buffer of the UE to deteriorate HARQ reception buffer utilization efficiency. In case of non-cross-CC scheduling, over-dimensioning is insignificant or ignorable and thus HARQ process related modules and hardware configuration of the UE can be simply implemented by reducing the number of available values of parameter $M_{DL\_HARQ}$ using Ref-Cfg-based HARQp. For a similar reason/purpose, Ref-Cfg-based HARQp can be applied in case of FD-TDD CA and actual-DL based HARQp can be applied in case of HD-TDD CA, for example. Similarly, Ref-Cfg-based HARQp can be applied in case A and actual-DL based HARQp can be applied in case B or C.

In a similar approach, upon determination of parameter $M_{DL\_HARQ}$ per CC according to HARQp, Ref-Cfg-based HARQp or a combination thereof, the equation for calculating $n_{SB}$ can be applied differently depending on whether $M_{DL\_HARQ}$ ($M_{DL\_HARQ(P)}$) of a PCC is larger than $M_{DL\_HARQ}$ ($M_{DL\_HARQ(S)}$) of an SCC and/or scheduling (i.e. cross-CC or non-cross-CC) for the SCC and/or whether the UE is permitted to simultaneously perform transmission and reception (i.e. FD-TDD CA or HD-TDD CA) and/or DL SF set relation (i.e. case A, B or C) between the PCC and the SCC. A method for uniformly partitioning the HARQ reception buffer for CCs by applying parameter $M_{DL\_HARQ}$ per CC to $M_{DL\_HARQ}$ in Equation 4 is referred to as "per-CC equal buffer" for convenience. A method for uniformly partitioning the HARQ reception buffer for HARQ processes by applying parameter $M_{DL\_HARQ}$ per CC to $M_{DL\_HARQ,n}$ in Equation 5 or 6 is referred to as "per-HARQp equal buffer" for convenience.

In an example of the proposed method, per-HARQp equal buffer can be applied when $M_{DL\_HARQ(P)} \geq M_{DL\_HARQ(S)}$ and per-CC equal buffer can be applied when $M_{DL\_HARQ(P)} \leq M_{DL\_HARQ(S)}$. Otherwise, per-HARQp equal buffer can be applied when $\min(M_{DL\_HARQ(P)}, M_{limit}) \geq \min(M_{DL\_HARQ(S)}, M_{limit})$ and per-CC equal buffer can be applied when $\min(M_{DL\_HARQ(P)}, M_{limit}) \leq \min(M_{DL\_HARQ(S)}, M_{limit})$ (here, $M_{DL\_HARQ(S)}$ may be a minimum value or a maximum value of values of $M_{DL\_HARQ}$ of SCCs when plural SCCs are present). When $M_{DL\_HARQ(P)} \geq M_{DL\_HARQ(S)}$ or $\min(M_{DL\_HARQ(P)}, M_{limit}) \geq \min(M_{DL\_HARQ(S)}, M_{limit})$, the number of HARQ processes with respect to the PCC is greater than that for the SCC. In this case, when per-CC equal buffer is applied, DL data reception performance in the PCC may be deteriorated since a reception buffer size per HARQ process for the PCC is smaller than that for the SCC. When $M_{DL\_HARQ(P)} \leq M_{DL\_HARQ(S)}$ or $\min(M_{DL\_HARQ(P)}, M_{limit}) \leq \min(M_{DL\_HARQ(S)}, M_{limit})$, that is, the number of HARQ processes with respect to the PCC is smaller than that for the SCC, DL data received on the PCC can be more protected by applying per-CC equal buffer. For a similar reason/purpose, per-HARQp equal buffer and per-CC equal buffer can be respectively applied to HD-TDD CA and FD-TDD CA, respectively applied to cross-CC scheduling and non-cross-CC scheduling (here, cross-CC scheduling can be considered as a case in which all or at least one SCC is cross-CC-scheduled when plural SCCs are present) or respectively applied to case A and case B or C (case A can be considered as a case in which all or at least one SCC and the PCC have the relationship of case A when plural SCCs are present).

Figure 21:
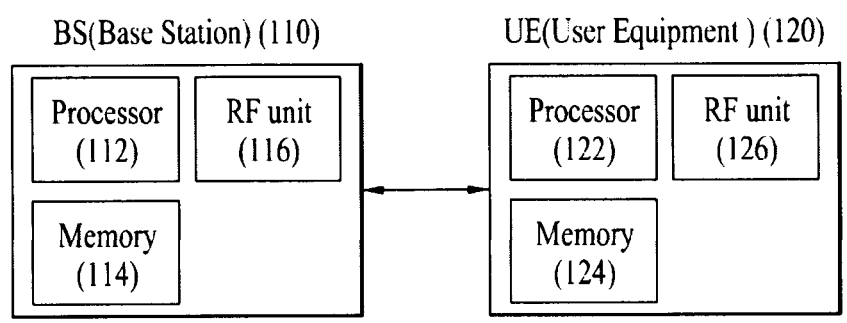
FIG. 21 illustrates a BS and a UE to which the present invention is applicable.

FIG. 21 illustrates a BS and a UE to which the present invention is applicable. When a wireless communication system includes a relay, backhaul link communication is performed between the BS and the relay and access link communication is carried out between the relay and the UE. Accordingly, the BS or UE illustrated in FIG. 21 can be replaced by the relay.

Referring to FIG. 21, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

The present invention can be used for radio communication apparatuses such as a UE, a relay, an eNB, etc.

The invention claimed is:

1. A method for carrying out hybrid automatic repeat request (HARQ) in a long-term evolution (LTE) wireless communication system supporting carrier aggregation, the method comprising:
setting a secondary cell having a first time division duplex (TDD) uplink-downlink (UL-DL) configuration and a primary cell having a second TDD UL-DL configuration different from the first TDD UL-DL configuration;
receiving data through a DL subframe of the secondary cell, wherein the data is scheduled by control information of the primary cell; and
storing at least a portion of the data in a HARQ soft buffer when decoding of the data fails,
wherein a size of soft channel bits in the HARQ soft buffer is determined by using the following expression:

$$\left\lfloor \frac{N'_{soft}}{C \cdot \sum_{n=0}^{N^{DL}_{cells}-1} \min(M_{DL\_HARQ,n}, M_{limit}) \cdot K_{MIMO}} \right\rfloor$$

where $N'_{soft}$ is the total number of soft channel bits, C is the number of code blocks, $N_{cells}^{DL}$ is the number of configured cells, $M_{DL\_HARQ,n}$ is the maximum number of HARQ processes for a cell #n, $M_{limit}$ is a constant value, $K_{MIMO}$ is 1 or 2, and $\lfloor\ \rfloor$ is a flooring function,
wherein $M_{DL\_HARQ,n}$ of the primary cell is determined as the number of DL or special subframes of the primary cell within a maximum HARQ round trip time (RTT) of the second TDD UL-DL configuration,
wherein $M_{DL\_HARQ,n}$ of the secondary cell is determined as the number of DL or special subframes of the secondary cell within a maximum HARQ RTT of a TDD UL-DL configuration having a smallest number of DL subframes among one or more TDD UL-DL configurations in which subframes set to DL in the primary cell or the secondary cell are all set to DL, provided that at least one subframe of the secondary cell in which the secondary cell is DL and the primary cell is UL is excluded when $M_{DL\_HARQ,n}$ of the secondary cell is determined.

2. The method according to claim 1, wherein subframe configurations according to TDD UL-DL configurations are defined as follows

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a special subframe and U denotes an uplink subframe.

3. A communication apparatus configured to carry out HARQ in a long-term evolution (LTE) wireless communication system supporting carrier aggregation, comprising:
a radio frequency (RF) unit; and
a processor,
wherein the processor is configured to set a secondary cell having a first TDD UL-DL configuration and a primary cell having a second TDD UL-DL configuration different from the first TDD UL-DL configuration, to receive data through a DL subframe of the secondary cell, wherein the data is scheduled by control information of the primary cell, and to store at least a portion of the data in a HARQ soft buffer when decoding of the data fails,
wherein a size of soft channel bits in the HARQ soft buffer is determined by using the following expression:

$$\left\lfloor \frac{N'_{soft}}{C \cdot \sum_{n=0}^{N^{DL}_{cells}-1} \min(M_{DL\_HARQ,n}, M_{limit}) \cdot K_{MIMO}} \right\rfloor$$

where $N'_{soft}$ is the total number of soft channel bits, C is the number of code blocks, $N_{cells}^{DL}$ is the number of configured cells, $M_{DL\_HARQ,n}$ is the maximum number of HARQ processes for a cell #n, $M_{limit}$ is a constant value, $K_{MIMO}$ is 1 or 2, and $\lfloor\ \rfloor$ is a flooring function,
wherein $M_{DL\_HARQ,n}$ of the cell is determined as the number of DL or special subframes of the primary cell within a maximum HARQ round trip time (RTT) of the second TDD UL-DL configuration,
wherein $M_{DL\_HARQ,n}$ of the secondary cell is determined as the number of DL or special subframes of the secondary cell within a maximum HARQ RTT of a TDD UL-DL configuration having a smallest number of DL subframes among one or more TDD UL-DL configurations in which subframes set to DL in the primary cell or the secondary cell are all set to DL, provided that at least one subframe of the secondary cell in which the secondary cell is DL and the primary cell is UL is excluded when $M_{DL\_HARQ,n}$ of the secondary cell is determined.

4. The communication apparatus according to claim 3, wherein subframe configurations according to TDD UL-DL configurations are defined as follows

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein d denotes a downlink subframe, s denotes a special subframe and u denotes an uplink subframe.

* * * * *